(12) United States Patent
Demont et al.

(10) Patent No.: US 10,576,843 B2
(45) Date of Patent: *Mar. 3, 2020

(54) CONSTRUCTION AND OPERATION OF ELECTRIC OR HYBRID AIRCRAFT

(71) Applicant: H55 SA, Sion (CH)

(72) Inventors: Sébastien Demont, Ayent (CH); Bastian Dani, Miège (CH)

(73) Assignee: H55 SA, Sion (CH)

( * ) Notice: Subject to any disclaimer, the term of this patent is extended or adjusted under 35 U.S.C. 154(b) by 0 days.

This patent is subject to a terminal disclaimer.

(21) Appl. No.: 16/506,849

(22) Filed: Jul. 9, 2019

(65) Prior Publication Data
US 2019/0337409 A1     Nov. 7, 2019

Related U.S. Application Data

(63) Continuation of application No. 16/211,074, filed on Dec. 5, 2018, now Pat. No. 10,479,223.
(Continued)

(30) Foreign Application Priority Data

Jan. 25, 2018  (CH) .............................. 20180000086
Jan. 25, 2018  (CH) .............................. 20180000087
May 4, 2018   (CH) .............................. 20180000564

(51) Int. Cl.
*B60L 58/18*     (2019.01)
*H02P 5/00*      (2016.01)
(Continued)

(52) U.S. Cl.
CPC ............. *B60L 58/18* (2019.02); *B60L 3/0061* (2013.01); *B60L 50/40* (2019.02); *B60L 53/00* (2019.02);
(Continued)

(58) Field of Classification Search
CPC ........ B60L 58/18; B60L 53/00; B60L 3/0061; B60L 50/40; B60L 2240/36;
(Continued)

(56) References Cited

U.S. PATENT DOCUMENTS

| 4,434,389 A | 2/1984 | Langley et al. |
| 4,550,267 A | 10/1985 | Vaidya |

(Continued)

FOREIGN PATENT DOCUMENTS

| CN | 102255113 | 11/2011 |
| DE | 102007054228 | 5/2009 |

(Continued)

OTHER PUBLICATIONS

Clips from Video "Charging an EV with a portable battery—Does it Work?", https://www.youtube.com/watch?v=xL3MICQTPvQ&t=864s, dated Nov. 2017, in 3 pages.
(Continued)

*Primary Examiner* — Jaime Figueroa
(74) *Attorney, Agent, or Firm* — Knobbe, Martens, Olson & Bear LLP

(57) ABSTRACT

This disclosure describes at least embodiments of an aircraft monitoring system for an electric or hybrid airplane. The aircraft monitoring system can be constructed to enable the electric or hybrid aircraft to pass certification requirements relating to a safety risk analysis. The aircraft monitoring system can have different subsystems for monitoring and alerting of failures of components, such as a power source for powering an electric motor, of the electric or hybrid aircraft. The failures that pose a greater safety risk may be monitored and indicated by one or more subsystems without use of programmable components.

22 Claims, 20 Drawing Sheets

Related U.S. Application Data

(60) Provisional application No. 62/724,503, filed on Aug. 29, 2018, provisional application No. 62/758,299, filed on Nov. 9, 2018.

(51) Int. Cl.

| | |
|---|---|
| *H02J 7/14* | (2006.01) |
| *B64F 5/60* | (2017.01) |
| *B60L 3/00* | (2019.01) |
| *B64D 45/00* | (2006.01) |
| *B60L 53/00* | (2019.01) |
| *B60L 50/40* | (2019.01) |
| *B64D 27/24* | (2006.01) |
| *H02J 7/34* | (2006.01) |

(52) U.S. Cl.
CPC ............. *B64D 27/24* (2013.01); *B64D 45/00* (2013.01); *B64F 5/60* (2017.01); *H02J 7/1423* (2013.01); *H02P 5/00* (2013.01); *B60L 2200/10* (2013.01); *B60L 2240/36* (2013.01); *B64D 2045/0085* (2013.01); *B64D 2221/00* (2013.01); *H02J 7/345* (2013.01); *H02J 2007/143* (2013.01)

(58) Field of Classification Search
CPC ................. B60L 2200/10; H02J 7/1423; H02J 2007/143; H02J 7/345; B64F 5/60; B64D 45/00; B64D 27/24; B64D 2221/00; B64D 2045/0085; H02P 5/00
USPC .......................................................... 701/1, 3
See application file for complete search history.

(56) References Cited

U.S. PATENT DOCUMENTS

| | | | |
|---|---|---|---|
| 4,730,150 A | 3/1988 | Lee et al. | |
| 5,225,764 A | 7/1993 | Falater | |
| 5,414,339 A | 5/1995 | Masaki et al. | |
| 5,850,113 A | 12/1998 | Weimer et al. | |
| 6,178,736 B1 * | 1/2001 | Massey ...................... | F02C 7/26 60/779 |
| 6,366,311 B1 * | 4/2002 | Monroe ............. | B64D 45/0015 348/148 |
| 6,439,504 B1 | 8/2002 | Ahrendt | |
| 6,791,226 B1 | 9/2004 | Dhawan | |
| 7,207,521 B2 | 4/2007 | Atkey et al. | |
| 7,482,767 B2 | 1/2009 | Tether | |
| 7,598,703 B2 | 10/2009 | Zhang et al. | |
| 8,120,310 B2 | 2/2012 | Littrell et al. | |
| 8,738,217 B2 * | 5/2014 | Banker ................. | B60W 20/00 701/29.1 |
| 9,457,666 B2 | 10/2016 | Caldeira et al. | |
| 9,643,729 B2 | 5/2017 | Walter-Robinson | |
| 10,131,246 B2 | 11/2018 | Demont | |
| 10,204,244 B2 | 2/2019 | Butler | |
| 10,322,824 B1 | 6/2019 | Demont et al. | |
| 2003/0182040 A1 * | 9/2003 | Davidson ............. | A41D 13/018 701/45 |
| 2006/0109009 A1 | 5/2006 | Banke | |
| 2007/0164166 A1 | 7/2007 | Hirvonen | |
| 2007/0164168 A1 | 7/2007 | Hirvonen et al. | |
| 2008/0006739 A1 | 1/2008 | Mochida et al. | |
| 2008/0211309 A1 | 9/2008 | Nolte | |
| 2008/0272669 A1 | 11/2008 | Mohle et al. | |
| 2009/0212626 A1 | 8/2009 | Snyder | |
| 2009/0302153 A1 | 12/2009 | Matasso | |
| 2010/0102934 A1 | 4/2010 | Guichard | |
| 2010/0121587 A1 * | 5/2010 | Vian ................... | H01M 10/425 702/63 |
| 2011/0054721 A1 | 3/2011 | Goodrich | |
| 2011/0254502 A1 | 10/2011 | Yount et al. | |
| 2012/0025032 A1 | 2/2012 | Hopdjanian | |
| 2012/0146581 A1 | 6/2012 | Tu | |
| 2012/0203482 A1 | 8/2012 | Parle et al. | |
| 2013/0076190 A1 | 3/2013 | Jarvinen et al. | |
| 2013/0305391 A1 | 11/2013 | Haukom | |
| 2014/0084817 A1 | 3/2014 | Bhavaraju | |
| 2014/0197681 A1 | 7/2014 | Iwashima | |
| 2014/0303812 A1 | 10/2014 | Avritch et al. | |
| 2014/0342201 A1 * | 11/2014 | Andres ............. | H01M 10/6567 429/62 |
| 2015/0115108 A1 | 4/2015 | Benson et al. | |
| 2015/0123622 A1 | 5/2015 | Yasui | |
| 2015/0285165 A1 | 10/2015 | Steinwandel | |
| 2015/0339371 A1 | 11/2015 | Cao et al. | |
| 2015/0344156 A1 * | 12/2015 | Vail, III .................... | B64F 5/60 701/32.8 |
| 2015/0353192 A1 | 12/2015 | Morrison | |
| 2015/0358002 A1 | 12/2015 | Startin | |
| 2016/0047861 A1 | 2/2016 | Chen | |
| 2016/0107758 A1 | 4/2016 | Esteyne et al. | |
| 2016/0236790 A1 | 8/2016 | Knapp | |
| 2016/0254576 A1 | 9/2016 | Burns | |
| 2016/0304214 A1 | 10/2016 | Himmelmann | |
| 2016/0347180 A1 | 12/2016 | Steffani | |
| 2017/0001511 A1 | 1/2017 | Kulkarni | |
| 2017/0008418 A1 | 1/2017 | Ciampolini et al. | |
| 2017/0054314 A1 * | 2/2017 | Tang ..................... | H02J 7/0045 |
| 2017/0057650 A1 | 3/2017 | Walter-Robinson | |
| 2017/0066531 A1 | 3/2017 | McAdoo | |
| 2017/0126025 A1 | 5/2017 | Bando et al. | |
| 2017/0210229 A1 | 7/2017 | Brochhaus | |
| 2017/0210481 A1 | 7/2017 | Bak | |
| 2017/0214070 A1 | 7/2017 | Wang | |
| 2017/0253344 A1 | 9/2017 | Wangemann et al. | |
| 2017/0309093 A1 | 10/2017 | Feng | |
| 2018/0024201 A1 | 1/2018 | Izawa | |
| 2018/0079530 A1 | 3/2018 | Wyrobek | |
| 2018/0105282 A1 | 4/2018 | Tweet | |
| 2018/0108188 A1 | 4/2018 | Canning | |
| 2018/0170511 A1 | 6/2018 | Mores | |
| 2018/0229618 A1 | 8/2018 | Lee | |
| 2018/0268719 A1 | 9/2018 | Guan | |
| 2018/0283292 A1 | 10/2018 | Steinwandel | |
| 2018/0321325 A1 | 11/2018 | Fortier | |
| 2019/0019638 A1 | 1/2019 | Humphreys | |

FOREIGN PATENT DOCUMENTS

| | | |
|---|---|---|
| DE | 102014200997 | 7/2015 |
| JP | 2011-114961 | 6/2011 |
| JP | 2012-175823 | 9/2012 |
| KR | 10-1733159 | 5/2017 |
| WO | WO 94/14226 | 6/1994 |
| WO | WO 2004/068694 | 8/2004 |
| WO | WO 2018/130488 | 7/2018 |

OTHER PUBLICATIONS

World's First Portable EV Power Unit on Sale Now, https://insideevs.com/worlds-first-portable-ev-power-unit-is-on-sale-now, dated Jun. 2012, in 6 pages.
Are modern aircraft provided with analog consoles in case of a software failure?—Aviation Stack Exchange, http:// aviation.stackexchange.com/questions/3905/are-modern-aircraft-provided-with-analog-consoles-in-case-of-a-software-failure, dated 2015, in 2 pages.
Palmer, Ryan C., "Applying Human Factors Principles in Aviation Displays: A Transition From Analog to Digital Cockpit Displays in the CP140 Aurora Aircraft", Master's Thesis, University of Tennessee, dated Aug. 2007, in 121 pages.
Switches: How to switch between two DC power sources powering a motor on an electric vehicle?—Electric Engineering Stack Exchange, https://electronics.stackexchange.com/questions/151341/how-to-switch-between-two-dc-power-sources-powering-a-motor-on-an-electric-vehicle, dated 2015, in 3 pages.
International Search Report and Written Opinion for International Application No. PCT/IB2018/060694, dated Apr. 5, 2019, in 14 pages.

(56) References Cited

OTHER PUBLICATIONS

International Search Report and Written Opinion for International Application No. PCT/IB2018/060696, dated Apr. 30, 2019, in 17 pages.
International Search Report and Written Opinion for International Application No. PCT/IB2019/053644, dated Jul. 15, 2019, in 15 pages.
International Search Report and Written Opinion for International Application No. PCT/IB2018/055110, dated Aug. 9, 2019, in 14 pages.

\* cited by examiner

CONSTRUCTION AND OPERATION OF ELECTRIC OR HYBRID AIRCRAFT

RELATED APPLICATIONS

Any and all applications for which a foreign or domestic priority claim is identified in the Application Data Sheet of the present application are hereby incorporated by reference under 37 CFR 1.57.

FIELD OF THE DISCLOSURE

The present disclosure is related to vehicles, such as electric or hybrid aircraft.

BACKGROUND

Electric and hybrid vehicles have become increasingly significant for the transportation of people and goods. Such vehicles can desirably provide energy efficiency advantages over combustion-powered vehicles and may cause less air pollution than combustion-powered vehicles during operation.

Although the technology for electric and hybrid automobiles has significantly developed in recent years, many of the innovations that enabled a transition from combustion-powered to electric-powered automobiles unfortunately do not directly apply to the development of electric or hybrid aircraft. The functionality of automobiles and the functionality of aircraft are sufficiently different in many aspects so that many of the design elements for electric and hybrid aircraft must be uniquely developed separate from those of electric and hybrid automobiles.

Moreover, any changes to an aircraft's design, such as to enable electric or hybrid operation, also require careful development and testing to ensure safety and reliability. If an aircraft experiences a serious failure during flight, the potential loss and safety risk from the failure may be very high as the failure could cause a crash of the aircraft and pose a safety or property damage risk to passengers or cargo, as well as individuals or property on the ground.

The certification standards for electric or hybrid aircraft are further extremely stringent because of the risks posed by new aircraft designs. Designers of aircraft have struggled to find ways to meet the certification standards and bring new electric or hybrid aircraft designs to market.

In view of these challenges, attempts to make electric and hybrid aircraft commercially viable have been largely unsuccessful. New approaches for making and operating electric and hybrid aircraft thus continue to be desired.

SUMMARY

Flying an aircraft such an airplane can be dangerous. Problems with the aircraft may result in injury or loss of life for passengers in the aircraft or individuals on the ground, as well as damage to goods being transported by the aircraft or other items around the aircraft.

In order to attempt to mitigate potential problems associated with an aircraft, numerous organizations have developed certification standards for ensuring that aircraft designs and operations satisfy threshold safety requirements. The certification standards may be stringent and onerous when the degree of safety risk is high, and the certification standards may be easier and more flexible when the degree of safety risk is low.

Such certification standards have unfortunately had the effect of slowing commercial adoption and production of electric or hybrid aircraft. Electrical hybrid aircraft may, for example, utilize new aircraft designs relative to traditional aircraft designs to account for differences in operations of electric or hybrid aircraft versus traditional aircraft. The new designs however may be significantly different from the traditional aircraft designs. These differences may subject the new designs to extensive testing prior to certification. The need for extensive testing can take many resources, time and significantly drive up the ultimate cost of the aircraft.

The present disclosure provides simplified, yet robust, components and systems for an electric powered aircraft that simplify and streamline certifications requirements and reduce the cost and time required to produce a commercially viable electric aircraft. The present disclosure provides multiple components and systems that can be mixed and matched according to aircraft needs and requirements. Accordingly, although multiple different components are described below, the components or systems are not required to be all used together in a single embodiment. Rather, each component or system can be used independent of the other components or systems of the present disclosure.

The aircraft can be designed so that different subsystems of the aircraft are constructed to have a robustness corresponding to their responsibilities and any related certification standards, as well as potentially any subsystem redundancies. Where a potential failure of the responsibilities of a subsystem would likely be catastrophic (for example, resulting in fatalities on the ground of individuals not in the aircraft, such as when an aircraft suddenly losses altitude), the subsystem can be designed to be very simple and robust and thus may be able to satisfy difficult certification standards. The subsystem, for example, can be composed of non-programmable, non-stateful components (for example, analog or non-programmable combinational logic electronic components) rather than a processor. The subsystem, for example, can activate indicators such as lights rather than more sophisticated displays. The subsystem thus may not be affected by software or programming bugs and may be less impacted by external interference, such as voltage spikes, electromagnetic interference, or radiation, which may cause a malfunction. On the other hand, where either (i) a subsystem of an aircraft monitors a parameter redundantly with another subsystem of the aircraft that is composed of non-programmable, non-stateful components or (ii) a potential failure of the responsibilities of a subsystem would likely be less than catastrophic (for example, result in hazardous, major, minor, or no safety effect), the subsystem can be at least partly digital and designed to be more complicated, feature-rich, and easier to update and yet able to satisfy associated certification standards. The subsystem can, for instance, include a programmable component or a stateful component like a processor that outputs and presents information on a sophisticated display. This can desirably enable the aircraft to maintain feature-rich systems without sacrificing robust, easily-certifiable safety systems. Although a programmable component or a stateful component may be difficult to safely and reliably update and the programmable component may be more prone to a malfunction due to voltage spikes, electromagnetic interference, or radiation than non-programmable, non-stateful components, the programmable component or the stateful component can more easily provide functionality which may be difficult to provide with non-programmable, non-stateful components.

The aircraft may be provided with a battery monitoring subsystem responsible for determining, for example, the health of battery components. If battery components were to overheat and catch fire, the aircraft would likely suffer a catastrophic failure and rapid loss of altitude. The battery monitoring subsystem thus can be constructed entirely of non-programmable, non-stateful components. The battery monitoring subsystem can, for instance, include one or more temperature sensors that detect the temperature proximate one or more batteries in the aircraft and output a signal responsive to detection of a temperature that exceeds a threshold indicative of an unsafe condition. The signal can in turn be hardwired to a light or a speaker in the cockpit of the aircraft to indicate the over-temperature condition to a pilot of the aircraft.

A separate power management subsystem may be incorporated with the aircraft to, for example, monitor battery life. The power management system can be responsible for monitoring and displaying an amount of energy remaining for powering an aircraft and can be constructed of a processor that outputs a graphical user interface or speaker. The power management subsystem need not be made of non-programmable, non-stateful components at least because the aircraft includes the battery monitoring subsystem which also monitors the health of the battery components. Thus, one monitoring system can be made of non-programmable, non-stateful components (such as, analog or non-programmable combinational logic electronic components) to monitor catastrophic failures, while one or more feature-rich processors, sequential logic electronic components, or programmable combinational logic electronic components of another monitoring system can provide additional catastrophic or other non-catastrophic monitoring of aircraft systems.

A redundant subsystem in an aircraft can desirably enable certain features of the aircraft to continue to be available even though a subsystem that is primarily responsible for the certain features may be inoperable. Moreover, the redundant subsystem can be secondarily responsible for the certain features without the subsystem that is primarily responsible for those features providing status or control information to the redundant subsystem. This can be beneficial, for example, in the event that the primary system suddenly fails. The secondary system can take over without the need for a handoff.

An aircraft in accordance with the disclosure herein can include multiple subsystems each capable of performing the responsibilities of one or more other of the multiple subsystems. For example, a first subsystem of the aircraft may be tasked with primary responsibility for managing a first set of tasks of the aircraft while a second subsystem of the aircraft may be tasked with secondary responsibility for the first set of tasks. Similarly, the second subsystem may be tasked with primary responsibility for a second set of tasks of the aircraft while the first subsystem may be tasked with secondary responsibility for the second set of tasks. If one of the first subsystem or the second subsystem is inoperative, the other of the first subsystem or the second subsystem can take over responsibility for the inoperative subsystem. A shared recorder may additionally store data that can be received by the first subsystem and the second subsystem from one or more aircraft components so that the first subsystem and the second subsystem may take over primary responsibility for one or more tasks based at least on the data stored to the shared recorder and without communication of status information or operating instructions between the first subsystem and the second subsystem. The first subsystem and the second subsystem can each be different instances of similar or the same computer hardware or software and the control features of the first subsystem and the second subsystem may be selectively activated or inactivated to enable primary or secondary control.

A motor of an aircraft can include multiple field coils. Each of the multiple field coils may be used to drive the motor during different phases of rotation for the motor. During use or over the life of the motor, however, one or more of the individual field coils can fail, which may cause a dramatic decrease in average power output by the motor.

To address the failure of one or more field coils of the motor, the controller of the aircraft can adjust its driving of at least some of the other field coils to compensate for the failure of the one or more field coils. For instance, the controller can drive the functioning field coils of the motor so that an average power output of the motor remains unchanged despite the failure of the one or more field coils or so that a decrease in average power output caused by the failure of the one or more field coils is reduced. The controller may provide greater current to some functioning field coils causing the instantaneous power output of the motor to increase during certain phases of rotation in order to make up for the failed coil(s).

An aircraft in accordance with the disclosure here may have features that improve the usability or operability of the aircraft.

An aircraft and its components can have different power needs at different times. At takeoff, the aircraft may consume a relatively significant amount of power for a short period of time to start moving the aircraft and bring the aircraft off the ground. At cruising altitude and speed, the aircraft may consume a relatively less significant amount of power over a longer period of time to maintain a consistent speed and altitude.

To flexibly satisfy the power needs of an aircraft, the aircraft can include different power supplies having different characteristics for supplying power to the same components of the aircraft at different times or the same time. The different power supplies can have different energy capacities or different power output capacities from one another and may be connected so that the different power supplies can pass power to each other. The different power supplies may, for example, be different batteries having battery cells with different energy or power output capacities.

Moreover, the aircraft can include one or more motors that are able to operate as a generator to charge the one or more different power supplies. One of the different power supplies can be used to drive the one or more motors while another of the different power supplies may be simultaneously charged by the one or more motors. This arrangement can be desirable, for example, because a charging power supply can charge from a supplying power supply without including additional circuitry and increasing the aircraft weight to otherwise facilitate charging of the charging power supply from the supplying power supply.

An electric or hybrid aircraft also poses a challenge for storing, monitoring, and utilizing numerous battery cells. The battery cells may together represent a significant amount of weight and take up a significant amount of space in the electric or hybrid aircraft. The battery cells can additionally pose a serious safety risk, such as in the event of fire or failure, and thus should be carefully managed. Different electric or hybrid aircraft may also have different physical designs and different power requirements that can influence the desired configurations of the battery cells for the different aircraft.

An aircraft in accordance with the disclosure herein can be powered using a modular battery system. The modular battery system can include multiple battery modules that may be physically connected. The battery cell modules can each include a module housing that supports multiple battery cells electrically connected in parallel with one another by a conductive plate and that may be connected to one or more module housings of other battery cell modules. The module housings can be shaped and sized so that the module housings can be coupled together and to fit a particular aircraft design or placement of the module housings in various parts of the aircraft. The multiple battery modules can further be connected in series with one another to form a power source for the aircraft that has a greater output voltage.

An aircraft monitoring system for an electric or hybrid airplane is disclosed. The aircraft monitoring system can be constructed to enable the electric or hybrid aircraft to pass certification requirements relating to a safety risk analysis. The aircraft monitoring system can have different subsystems for monitoring and alerting of failures of components of the electric or hybrid aircraft, and the failures that pose a greater safety risk can be monitored and indicated by one or more subsystems without use of programmable components. The aircraft monitoring system can include a first subsystem and a second subsystem. The first subsystem can be supported by a housing and consist of non-programmable components. The housing can fly and be propelled by an electric motor. The non-programmable components can monitor a power source supported by the housing and output a first alert to notify of a first condition associated with the power source. The power source can power the electric motor, and the first condition can be likely to imminently cause a fatality or a destruction of the housing. The second subsystem can be supported by the housing and include a processor and a communication bus. The processor can monitor the power source from communications on the communication bus and output a second alert to notify of a second condition associated with the power source.

The aircraft monitoring system of the preceding paragraph can include one or more of the following features: The non-programmable components can consist of analog or combinational logic electronic components. The non-programmable components can consist of non-stateful components. Any subsystem that is supported by the housing and configured to notify of catastrophic conditions can monitor for the catastrophic conditions and notify of the catastrophic conditions without using programmable components or stateful components, and the catastrophic conditions being likely to imminently cause the fatality or the destruction of the housing. The non-programmable components can activate an indicator supported by the housing to output the first alert, and the indicator can remain inactive unless the indicator is outputting the first alert. The indicator can include a light or an audible alarm. The first subsystem may not control the power source, and the second subsystem can control the power source. The first subsystem can process analog signals and binary signals but may not multivalued digital signals. The aircraft monitoring system can include multiple printed circuit boards, and at least part of the first subsystem and at least part of the second subsystem can be mounted on the multiple printed circuit boards. The first subsystem may not communicate via the communication bus. The non-programmable components can monitor the power source using a first output from a first sensor, and the processor can monitor the power source using a second output from a second sensor different from the first sensor. The first sensor and the second senor can detect a state of the power source. The first sensor and the second senor can measure a temperature of the power source. The first sensor and the second senor can detect an undervoltage condition, an overvoltage condition, an underpressure condition, an overpressure condition, an undercurrent condition, an overcurrent condition, an excessive internal resistance condition, a low internal resistance condition, a high temperature condition, or a low temperature condition of the power source. The first sensor and the second senor can detect that the power source is on fire. The non-programmable components can output the first alert to the processor or another processor supported by the housing, and the processor or the another processor can activate a component supported by the housing to attempt to address the first condition. The non-programmable components can output the first alert to an electronic device remote from the housing. The non-programmable components and the processor can monitor the power source using a common output from a sensor. The second alert can indicate that an amount of energy stored by the power source is below a threshold. The power source can include a battery. The first condition can be a failure or an overheating of the power source. The first condition can be the power source being on fire. The first alert can indicate that a crash of the housing is imminent. The non-programmable components can include an electronic device configured to process an analog signal. The aircraft monitoring system can include a display configured to present the second alert.

A method of operating an aircraft monitoring system of an electric or hybrid airplane is disclosed. The aircraft monitoring system can be constructed to enable the electric or hybrid aircraft to pass certification requirements relating to a safety risk analysis. The method can include: supporting a first subsystem and a second subsystem with a housing, the first subsystem consisting of non-programmable components, the second subsystem comprising a processor and a communication bus, the housing being configured to fly and be propelled by an electric motor; powering, by the power source, the electric motor; monitoring, by the non-programmable components, a power source supported by the housing; outputting, by the non-programmable components, a first alert to notify of a first condition associated with the power source, the first condition being likely to imminently cause a fatality or a destruction of the housing; monitoring, by the processor, the power source from communications on the communication bus; and outputting, by the processor, a second alert to notify of a second condition associated with the power source.

The method of the preceding paragraph can include one or more of the following features: The method can include activating an indicator supported by the housing to output the first alert, inactivating the indicator when the non-programmable components are not outputting the first alert, and presenting the second alert on a display supported by the housing. The non-programmable components monitor the power source using a first output from a first sensor, and the processor monitors the power source using a second output from a second sensor. The method can include, by the first sensor and the second sensor, detecting an undervoltage condition, an overvoltage condition, an underpressure condition, an overpressure condition, an undercurrent condition, an overcurrent condition, an excessive internal resistance condition, a low internal resistance condition, a high temperature condition, or a low temperature condition associated with the power source. The method can include, responsive to the first alert, activating a component supported by the housing to attempt to address the first condition.

A power management system for a vehicle is disclosed. The power management system can include batteries that have different energy density and power density battery cells from one another and that are usable for selectively powering a transducer of the vehicle at different times and for charging one another. The power management system can include a first battery, a second battery, and electronic circuitry. The first battery can power a transducer supported by a housing. The transducer can propel the housing. The second battery can power the transducer and charge the first battery. The second battery can include lower energy density battery cells and higher power density battery cells than the first battery. The electronic circuitry can control whether one or both of the first battery or the second battery powers the transducer.

The power management system of the preceding paragraph can include one or more of the following features: The electronic circuitry can control when the second battery charges the first battery. The electronic circuitry can cause the second battery to charge the first battery while the first battery is powering the transducer. The electronic circuitry can cause the second battery to charge the first battery while the first battery is not powering the transducer. The power management system can include a supercapacitor configured to charge the first battery. The electronic circuitry can cause the supercapacitor to charge the first battery. The electronic circuitry can control whether the supercapacitor powers the transducer. The transducer can charge the supercapacitor. The power management system can include a converter that may convert first electrical current from the first battery into second electrical current to charge the second battery. The first battery or the second battery can include Li-Ion or Li—Po battery cells. The electronic circuitry can include a controller. The transducer can charge the first battery or the second battery. The power management system can include a commutator that may determine whether the transducer is charging either the first battery or the second battery. The power management system can include another transducer on a common axis as and mechanically coupled to the transducer, and the another transducer can charge the first battery or the second battery while the transducer propels the housing. The electronic circuitry can generate a drive signal to operate the transducer.

A method of operating a power management system of a vehicle is disclosed. The method can include: powering, by a first battery, a transducer supported by a housing; powering, by a second battery comprising lower energy density battery cells and higher power density battery cells than the first battery, the transducer; propelling, by the transducer, the housing; and controlling, by electronic circuitry, whether one or both of the first battery or the second battery powers the transducer.

The method of the preceding paragraph can include one or more of the following features: The method can include powering, by a supercapacitor, the transducer; and controlling, by the electronic circuitry, whether the supercapacitor powers the transducer. The method can include charging, by the transducer, the first battery or the second battery. The method can include generating, by the electronic circuitry, a drive signal to operate the transducer.

A power management system for a vehicle having one or more transducers is disclosed. The power management system can include a first battery, a second battery, and electronic circuitry. The first battery can power a first transducer supported by a housing. The first transducer can propel the housing. The second battery can power a second transducer supported by the housing. The second transducer can propel the housing and charge the second battery. The electronic circuitry can cause the first battery to power the first transducer while the second transducer charges the second battery.

The power management system of the preceding paragraph can include one or more of the following features: The first transducer and the second transducer can be the same transducer. The first transducer can include a rotor, a first set of windings, and a second set of windings, and the first set of windings can be usable to drive the rotor from the first battery and the second set of windings can be usable to charge the second battery. The first transducer and the second transducer can be mechanically coupled to one another. The first transducer and the second transducer can be different transducers. The electronic circuitry can operate the first transducer or the second transducer in multiple modes, and the multiple modes can include a first mode in which the first transducer is powered by the first battery and not the second battery. The multiple modes can include one or more of a second mode in which the first transducer is powered by the first battery and the second battery, a third mode in which the first transducer is powered by the second battery and not the first battery, a fourth mode in which the first transducer is powered by the first battery and the second transducer is charging the second battery, a fifth mode in which the first transducer is charging the first battery and the second transducer is powered by the second battery, a sixth mode in which the first transducer is charging the first battery and the second battery is not charging or powering, a seventh mode in which the second transducer is charging the second battery and the first battery is not charging or powering, or an eighth mode in which the first transducer is charging the first battery and the second transducer is charging the second battery. The power management system can include a supercapacitor, and the multiple modes can include one or more of a ninth mode in which the first transducer or the second transducer is powered by the supercapacitor, a tenth mode in which the first transducer or the second transducer is powered by the supercapacitor and the first battery or the second battery, an eleventh mode in which the first transducer is powered by the first battery, the second transducer is powered by the second battery, and the first transducer or the second transducer is charging the supercapacitor, an twelfth mode in which the first transducer or the second transducer is charging the supercapacitor, and a thirteenth mode in which the first transducer or the second transducer is charging the supercapacitor and the first battery or the second battery. The second battery can include lower energy density battery cells and higher power density battery cells than the first battery. The power management system can include a supercapacitor. The electronic circuitry can include power the transducer from the first battery, the second battery, and the supercapacitor. The first transducer can charge the first battery, the second battery, or the supercapacitor. The supercapacitor can charge the first battery or the second battery. The electronic circuitry can include one or more controllers. The electronic circuitry can generate a drive signal to operate the first transducer or the second transducer.

A method of operating a power management system of a vehicle is disclosed. The method can include: powering, by a first battery, a first transducer supported by a housing; powering, by a second battery different from the first battery, a second transducer supported by the housing; propelling, by the first transducer, the housing; propelling, by the second transducer, the housing; and charging, by the second transducer, the second battery while the first battery powers the first transducer.

The method of the preceding paragraph can include one or more of the following features: The first transducer and the second transducer can be the same transducer. The first transducer can include a rotor, a first set of windings, and a second set of windings, and the charging can include charging, by the second set of windings, the second battery while the first battery drives the rotor via the first set of windings. The method can include mechanically coupling the first transducer to the second transducer.

A power management system for a vehicle having an electric motor is disclosed. The power management system can include a first power source, a second power source, and electronic circuitry. The first power source can power an electric motor supported by a housing. The electric motor can propel the housing. The second power source can power the electric motor and, when the first power source is powering the electric motor, charge from the electric motor; the electronic circuitry can cause the first power source to power the electric motor while the electric motor charges the second power source. The electric motor can include a rotor, a first set of windings, and a second set of windings, and the first set of windings can be usable to drive the rotor from the first power source and the second set of windings can be usable to charge the second power source from the rotor.

An operation management system for a vehicle is disclosed. The operation management system can include a first subsystem and a second subsystem different from the first subsystem. Each of the first subsystem and the second subsystem can control multiple components using bus data received on a communication bus. Multiple components can be supported by a housing and include a first component and a second component. The housing can be propelled by a motor that is powered by a power source. The first subsystem can manage operations of the first component and, when the second subsystem is not operational, manage operations of the second component. The second subsystem can manage the operations of the second component and, when the first subsystem is not operational, manage the operations of the first component.

The operation management system of the preceding paragraph can include one or more features: When the first subsystem is not operational, the second subsystem can begin managing the operations of the first component without the first subsystem communicating operation data about the first component to the second subsystem. In the event of a failure of the first subsystem when the first subsystem is managing the operations of the first component, the second subsystem can automatically begin managing the operations of the first component. The first component can include the motor, and the second component can include the power source. The first component can include the power source, and the second component can include the motor. The first subsystem can execute the same computer software instructions as the second subsystem. The first subsystem can include a different instance of the same computer hardware as the second subsystem. The operation management system can include a recorder configured to store the bus data, and the first subsystem and the second subsystem can receive the bus data from the recorder rather than from other components that are configured to transmit the bus data via the communication bus. The bus data can include operation data about the first component or the second component. The bus data can include a state of the first component or the second component, a temperature of the first component or the second component, or an undervoltage condition or an overvoltage condition of the first component or the second component. The power source comprises a battery. The operation management system can include one or more sensors configured to transmit the bus data via the communication bus.

A method of making or using the operation management system of the preceding two paragraphs is disclosed.

A control system for a vehicle motor that includes multiple field coils is disclosed. The control system can include a memory device and a controller. The memory device can store an operating parameter. The controller can vary, according to the operating parameter, an electrical current provided to individual field coils of multiple field coils of a motor to compensate for a failure of one or more of the multiple field coils and maintain a power output of the motor despite the failure of the one or more of the multiple field coils. The multiple field coils can generate a torque on a rotor of the motor. The motor can be supported by a housing and propel the housing.

The control system of the preceding paragraph can include one or more of the following features: The controller can vary a rotation rate of the motor or a pitch of a propeller supported by the housing to compensate for the failure of the one or more of the multiple field coils and maintain the power output despite the failure of the one or more of the multiple field coils. The controller can: prior to a failure of a first field coil of the multiple field coils, provide the electrical current one time to all of the multiple field coils in an order prior to providing the electrical current another time to any of the multiple field coils; and subsequent to the failure of the first field coil, no longer provide the electrical current to the first field coil. The controller can, subsequent to the failure of the first field coil, increase the electrical current provided to at least some of the multiple field coils to compensate for the failure of the first field coil. The controller can, subsequent to the failure of the first field coil, increase the electrical current provided to a second field coil and a third field coil of the multiple field coils. The first field coil can be before the second field coil and after the third field coil in the order. A sensor can detect the failure of the one or more of the multiple field coils. The sensor can detect the failure of the one or more of the multiple field coils from a temperature, an electrical current, or a magnetic field measured by the sensor. The controller can no longer provide the electrical current to a first field coil of the multiple field coils in response to detecting the failure of the first field coil. The controller can set the operating parameter responsive to an output from the sensor. The controller can vary the electrical current provided to the individual field coils to compensate for the failure of at least two of the multiple field coils. The controller can vary the electrical current provided to the individual field coils to compensate for the failure of at least three of the multiple field coils. The controller can modulate power input to the motor over time to compensate for the failure of the one or more of the multiple field coils. The controller can, during a modulation cycle for the motor, increase the power input to one or more functioning field coils of the multiple field coils to compensate for the failure of the one or more of the multiple field coils. The controller can maintain the power output of the motor above a threshold despite the failure of the one or more of the multiple field coils. The operating parameter can indicative of which of the one or more of the multiple field coils have failed. The motor can be an electric motor.

A method of operating a motor of a vehicle is disclosed. The method can include: supporting, by a housing, a motor;

providing an electrical current to individual field coils of a multiple field coils of a motor to generate a torque on a rotor of the motor; propelling, by the motor, the housing; and varying the electrical current provided to the individual field coils of the multiple field coils to compensate for a failure of one or more of the multiple field coils and maintain a power output of the motor despite the failure of the one or more of the multiple field coils.

The method of the preceding paragraph can include one or more of the following features: The method can include varying a rotation rate of the motor or a pitch of a propeller supported by the housing to compensate for the failure of the one or more of the multiple field coils and maintain the power output despite the failure of the one or more of the multiple field coils. The varying can include, subsequent to the failure of a first field coil of the multiple field coils, increasing the electrical current provided to at least some of the multiple field coils to compensate for the failure of the first field coil. The method can include detecting, by a sensor, the failure of the one or more of the multiple field coils. The power output of the motor can be maintained above a threshold despite the failure of the one or more of the multiple field coils.

A modular power system for an electric or hybrid airplane is disclosed. The modular power system can include a power source configured to power a motor and including a multiple battery modules. The motor can propel a vehicle housing that is configured to fly. The multiple battery modules can include a first battery module and a second battery module. The first battery module can include a first module housing, multiple first battery cells, and a first plate. The first module housing can support the multiple first battery cells, and the multiple first battery cells can be electrically connected in parallel with one another at least by the first plate. The second battery module can include a second module housing, multiple second battery cells, and a second plate. The second module housing can support the multiple second battery cells and be coupled to the first module housing. The multiple second battery cells can be electrically connected in parallel with one another at least by the second plate and electrically connected in series with the multiple first battery cells.

The modular power system of the preceding paragraph can include one or more of the following features: The first plate can distribute heat evenly across the multiple first battery cells so that the multiple first battery cells age at a common rate. The first battery module can be cooled by air. The first plate can include copper. The multiple first battery cells can include 16 battery cells. Each of at least some of the multiple first battery cells can be substantially shaped as a cylinder. The first module housing can be substantially shaped as a rectangular prism. The first module housing can include plastic. The first module housing can prevent a fire in the multiple first battery cells from spreading outside of the first module housing. The modular power system can include one or more sensors that monitor a voltage or a temperature of individual battery cells of the plurality of first battery cells. The power source can be electrically isolated by galvanic isolation from another power source configured to power the motor. The first battery module may not be electrically isolated by galvanic isolation from the second battery module. The power source can have an output voltage less than 120 V. The power source can have a maximum power output between 1 kW and 60 kW during operation. The power source can have a maximum voltage output between 10 V and 120 V during operation. The power source has a maximum current output between 100 A and 500 A during operation. A first side of the first module housing can couple to the second module housing, and a second side of the first module housing opposite the first side can couple to a third module housing that supports a plurality of third battery cells. The first module housing and the second module housing can be sized and shaped to fit between structural supports of the vehicle housing when the first module housing is coupled to the second module housing. The first module housing and the second module housing can be sized and shaped to fit within a wing of the vehicle housing when the first module housing is coupled to the second module housing. The first module housing and the second module housing can be sized and shaped to fit within an engine compartment of the wing when the first module housing is coupled to the second module housing. The first module housing and the second module housing each can have an outer length, an outer width, and an outer height that each range from 30 mm to 250 mm. The outer length, the outer width, and the outer height each can range from 50 mm to 100 mm. The first battery module and the second battery module can be electrically coupled in series with multiple additional battery modules. A total number of battery modules included in the plurality of additional battery modules can adjust to scale a size or an output of the power source. One or more of the first battery module, the second battery module, or the multiple additional battery modules can be disconnected to reduce a size or an output of the power source.

A modular power system for an electric or hybrid airplane is disclosed. The modular power system can include a power source configured to power a motor and including multiple battery modules. The motor can propel a vehicle housing that is configured to fly, the multiple battery modules including a first battery module and a second battery module. The first battery module can include a first module housing and a plurality of first battery cells. The first module housing can support the multiple first battery cells and have a first outer length, a first outer width, and a first outer height ranging from 30 mm to 250 mm. The second battery module can include a second module housing and multiple second battery cells. The second module housing can support the multiple second battery cells and coupled to the first module housing. The second module housing can have a second outer length, a second outer width, and a second outer height each ranging from 30 mm to 250 mm. The second battery cells can be electrically connected in parallel with one another and electrically connected in series with the multiple first battery cells.

A method of making or using the modular power system of the preceding three paragraphs is disclosed.

DETAILED DESCRIPTION

System Overview

Figure 1A:
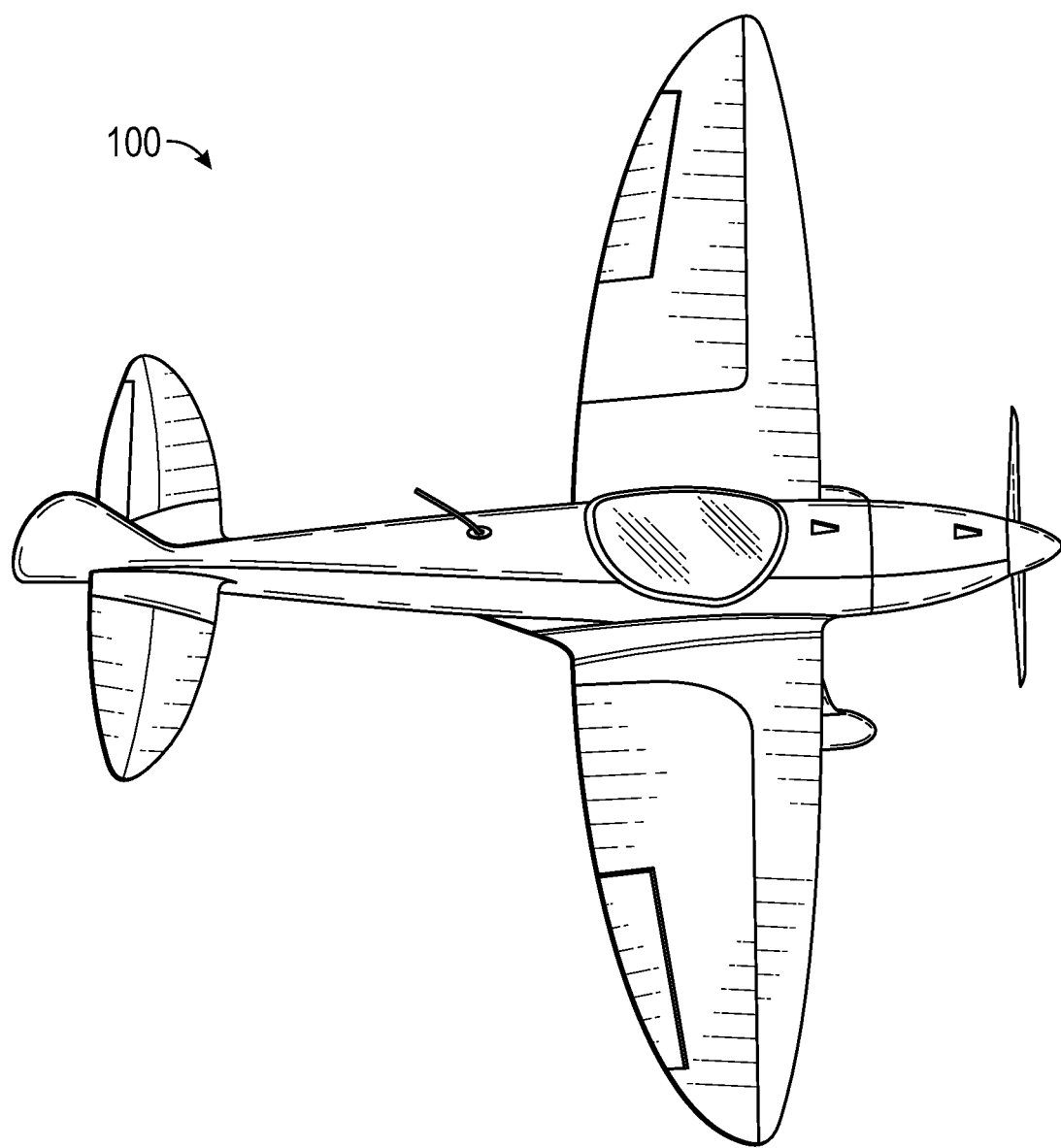
FIG. 1A illustrates an aircraft, such as an electric or hybrid aircraft.
Figure 1B:
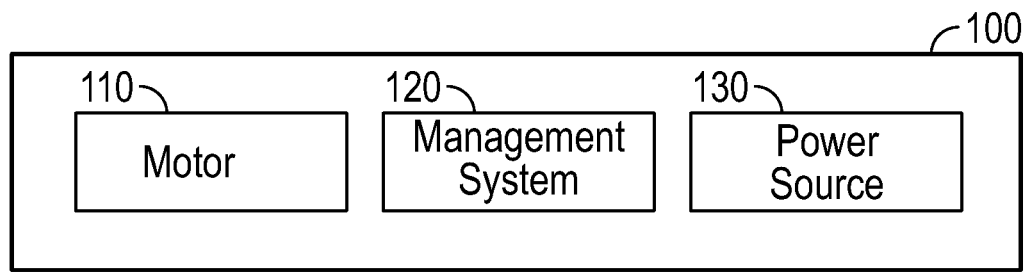
FIG. 1B illustrates a simplified block diagram of an aircraft.

FIG. 1A illustrates an aircraft 100, such as an electric or hybrid aircraft, and FIG. 1B illustrates a simplified block diagram of the aircraft 100. The aircraft 100 includes a motor 110, a management system 120, and a power source 130. The motor 110 can be used to propel the aircraft 100 and cause the aircraft 100 to fly and navigate. The management system 120 can control and monitor of the components of the aircraft 100, such as the motor 110 and the power source 130. The power source 130 can power the motor 110 to drive the aircraft 100 and power the management system 120 to enable operations of the management system 120. The management system 120 can include one or more controllers as well as other electronic circuitry for controlling and monitoring the components of the aircraft 100.

Figure 2:
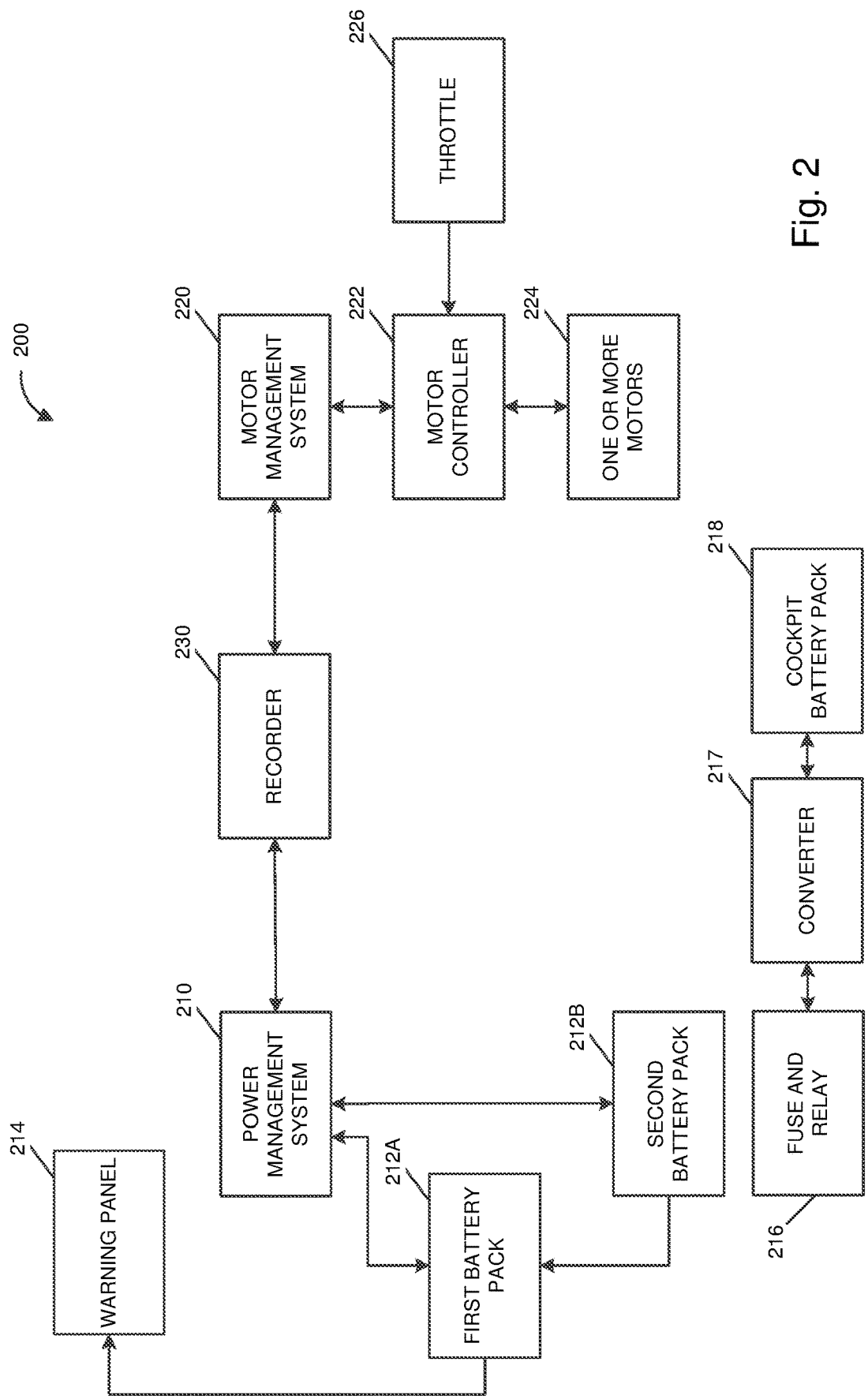
FIG. 2 illustrates management systems for operating an aircraft.

FIG. 2 illustrates components 200 of an aircraft, such as the aircraft 100 of FIGS. 1A and 1B. The components 200 can include a power management system 210, a motor management system 220, and a recorder 230, as well as a first battery pack 212A, a second battery pack 212B, a warning panel 214, a fuse and relay 216, a converter 217, a cockpit battery pack 218, a motor controller 222, one or more motors 224, and a throttle 226.

The power management system 210, the motor management system 220, and the recorder 230 can monitor communications on a communication bus, such as a controller area network (CAN) bus, and communicate via the communication bus. The first battery pack 212A and the second battery pack 212B can, for instance, communicate on the communication bus enabling the power management system 210 to monitor and control the first battery pack 212A and the second battery pack 212B. As another example, the motor controller 222 can communicate on the communication bus enabling the motor management system 220 to monitor and control the motor controller 222.

The recorder 230 can store some or all data communicated (such as component status, temperature, or over/undervoltage information from the components or other sensors) on the communication bus to a memory device for later reference, such as for reference by the power management system 210 or the motor management system 220 or for use in troubleshooting or debugging by a maintenance worker. The power management system 210 and the motor management system 220 can each output or include a user interface that presents status information and permits system configurations. The power management system 210 can control a charging process (for instance, a charge timing, current level, or voltage level) for the aircraft when the aircraft is coupled to an external power source to charge a power source of the aircraft, such as the first battery pack 212A or the second battery pack 212B.

The warning panel 214 can be a panel that alerts a pilot or another individual or computer to an issue, such as a problem associated with a power source like the first battery pack 212A. The fuse and relay 216 can be associated with the first battery pack 212A and the second battery pack 212B and usable to transfer power through a converter 217 (for example, a DC-DC converter) to a cockpit battery pack 218. The fuse and relay 216 can protect one or more battery poles of the first battery pack 212A and the second battery pack 212B from a short or overcurrent. The cockpit battery pack 218 may supply power for the communication bus.

The motor management system 220 can provide control commands to the motor controller 222, which can in turn be used to operate the one or more motors 224. The motor controller 222 may further operate according to instructions from the throttle 226 that may be controlled by a pilot of the aircraft. The one or more motors can include an electric brushless motor.

The power management system 210 and the motor management system 220 can execute the same or similar software instructions and may perform the same or similar functions as one another. The power management system 210, however, may be primarily responsible for power management functions while the motor management system 220 may be secondarily responsible for the power management functions. Similarly, the motor management system 220 may be primarily responsible for motor management functions while the power management system 210 may be secondarily responsible for the motor management functions. The power management system 210 and the motor management system 220 can be assigned respective functions, for example, according to system configurations, such as one or more memory flags in memory that indicate a desired functionality. The power management system 210 and the motor management system 220 may include the same or similar computer hardware.

The power management system 210 can automatically perform the motor management functions when the motor management system 220 is not operational (such as in the event of a rebooting or failure of the motor management system 220), and the motor management system 220 can automatically perform the power management functions when the power management system 210 is not operational (such as in the event of rebooting or failure of the power management system 210). Moreover, the power management system 210 and the motor management system 220 can take over the functions from one another without communicating operation data, such as data about one or more of the components being controlled or monitored by the power management system 210 and the motor management system 220. This can be because both the power management system 210 and the motor management system 220 may be consistently monitoring communications on the communication bus to generate control information, but the control information may be used if the power management system 210 and the motor management system 220 has primary responsibility but not if the power management system 210 and the motor management system 220 does not have primary responsibility. Additionally or alternatively, the power management system 210 and the motor management system 220 may access data stored by the recorder 230 to obtain information usable to take over primary responsibility.

System Architecture

Electric and hybrid aircraft (rather than aircraft powered during operation by combustion) have been designed and manufactured for decades. However, electric and hybrid aircraft have still not yet become widely used for most transport applications like carrying passengers or goods.

This failure to adopt may be in large part because designing an aircraft that is sufficiently safe to be certified by certification authorities may be very difficult. The certification of prototypes may moreover not be sufficient to certify for commercial applications. Instead, a certification of each individual aircraft and its components may be required.

This disclosure provides at least some approaches for constructing electric powered aircraft from components and systems that have been designed to pass certification requirements so that the aircraft itself may pass certification requirements and proceed to active commercial use.

Certification requirements can be related to a safety risk analysis. A condition that may occur with an aircraft or its components can be assigned to one of multiple safety risk assessments, which may in turn be associated with a particular certification standard. The condition can, for example, be catastrophic, hazardous, major, minor, or no safety effect. A catastrophic condition may be one that likely results in multiple fatalities or loss of the aircraft. A hazardous condition may reduce the capability of the aircraft or the operator ability to cope with adverse conditions to the extent that there would be a large reduction in safety margin or functional capability crew physical distress/excessive workload such that operators cannot be relied upon to perform required tasks accurately or completely or serious or fatal injury to small number of occupants of aircraft (except operators) or fatal injury to ground personnel or general public. A major condition can reduce the capability of the aircraft or the operators to cope with adverse operating condition to the extent that there would be a significant reduction in safety margin or functional capability, significant increase in operator workload, conditions impairing operator efficiency or creating significant discomfort physical distress to occupants of aircraft (except operator), which can include injuries, major occupational illness, major environmental damage, or major property damage. A minor condition may not significantly reduce system safety such that actions required by operators are well within their capabilities and may include a slight reduction in safety margin or functional capabilities, slight increase in workload such as routine flight plan changes, some physical discomfort to occupants or aircraft (except operators), minor occupational illness, minor environmental damage, or minor property damage. A no safety effect condition may be one that has not effect on safety.

An aircraft can be designed so that different subsystems of the aircraft are constructed to have a robustness corresponding to their responsibilities and any related certification standards, as well as potentially any subsystem redundancies. Where a potential failure of the responsibilities of a subsystem would likely be catastrophic, the subsystem can be designed to be simple and robust and thus may be able to satisfy difficult certification standards. The subsystem, for instance, can be composed of non-programmable, non-stateful components (for example, analog or non-programmable combinational logic electronic components) rather than programmable components (for example, a processor, a field programmable gate array (FPGA), or a complex programmable logic device (CPLD)) or stateful components (for example, sequential logic electronic components) and activate indicators such as lights rather than more sophisticated displays. On the other hand, where either (i) a subsystem of an aircraft monitors a parameter redundantly with another subsystem of the aircraft that is composed of non-programmable, non-stateful components or (ii) a potential failure of the responsibilities of a subsystem would likely be less than catastrophic, the subsystem can be at least partly digital and designed to be complicated, feature-rich, and easier to update and yet able to satisfy associated certification standards. The subsystem can, for instance, include a processor that outputs information to a sophisticated display for presentation.

In some implementations, some or all catastrophic conditions monitored for by an aircraft can be monitored for with at least one subsystem that does not include a programmable component or a stateful component because certifications for programmable components or stateful components may demand statistical analysis of the responsible subsystems, which can be very expensive and complicated to certify. Such implementations can moreover be counter-intuitive at least because an electric or hybrid aircraft may include one or more relatively advanced programmable or stateful components to enable operation of the electric or hybrid aircraft, so the inclusion of one or more subsystems in the aircraft that does not include any programmable components or any stateful components may be unexpected because the one or more relatively advanced programmable or stateful components may be readily and easily able to implement the functionality of the one or more subsystems that does not include any programmable components or any stateful components.

An aircraft monitoring system can include a first subsystem and a second subsystem. The first subsystem can be supported by an aircraft housing and include non-programmable, non-stateful components, such as analog or non-programmable combinational logic electronic components. The non-programmable, non-stateful components can monitor a component supported by the aircraft housing and output a first alert to notify of a catastrophic condition associated with the component. The non-programmable, non-stateful components can, for instance, activate an indicator or an audible alarm for a passenger aboard the housing to output the first alert. The indicator or audible alarm may remain inactive unless the indicator is outputting the first alert. Additionally or alternatively, the non-programmable, non-stateful components can output the first alert to a computer aboard or remote from the aircraft (for example, to automatically trigger actions to attempt to respond to or address the catastrophic condition, such as to stop charging or activate a fire extinguisher, a parachute, or an emergency landing procedure or other emergency response feature) or an operator of the aircraft via a telemetry system. The non-programmable, non-stateful components may, moreover, not be able to control the component or at least control certain functionality of the component, such as to control a mode or trigger an operation of the component.

The second subsystem can be supported by the aircraft housing and include a processor (or another programmable or stateful component), as well as a communication bus. The processor can monitor the component from communications on the communication bus and output a second alert to notify of a catastrophic condition or a less than catastrophic condition associated with the component. The processor can, for instance, activate an indicator or audible alarm for a passenger aboard the housing to output the second alert. Additionally or alternatively, the processor can output the second alert to a computer aboard or remote from the aircraft (for example, to automatically trigger actions to attempt to address the catastrophic condition, such as to activate a fire extinguisher, a parachute, or an emergency landing procedure) or an operator of the aircraft via a telemetry system. The processor may control the component. The non-programmable, non-stateful components of the first subsystem additionally may not be able to communicate via the communication bus.

An example of such a design and its benefits are next described in the context of battery management systems. Notably, the design can be additionally or alternatively applied to other systems of a vehicle that perform functions other than battery management, such as motor control.

Battery Management Example

Battery packs including multiple battery cells, such as lithium-ion cells, can be used in electric cars, electric aircraft, and other electric self-powered vehicles. The battery cells may be connected in series or in parallel to deliver an appropriate voltage and current.

Battery cells in battery packs can be managed and controlled by battery management systems (BMS). A BMS can be a circuit that manages a rechargeable battery cell by controlling its charging and discharge cycles, preventing it from operating outside its safe operating area, balancing the charge between cells, or the like. BMS can also monitor battery parameters, such as the temperature, voltage, current, internal resistance, or pressure of the battery cell, and report anomalies. BMS can be provided by various manufacturers as discreet electronic components.

Damage to battery cells can be very serious incidents that may cause fire, explosions, or interruption of the powered circuit. Therefore, any damage to a battery in a vehicle, such as an electric airplane, may desirably be reported immediately and reliably to the pilot or driver of the vehicle. A reliable monitoring of battery cells by BMS can be critical for the safety of electric airplanes.

However, BMS can have failings in rare occurrences that cause problems with battery cells which may not be reported correctly. For example, an overvoltage or overtemperature condition can, in some situations, affect not only a battery cell, but also its BMS, so that the failure of the battery cell is either not detected or not reported correctly. Even if the BMS functions correctly, a connecting bus between the BMS and the cockpit might be defective and prevent warning signals from being transmitted.

In order to prevent this risk, battery cells can be monitored with a second, redundant BMS. If both BMS are of the same type, a defect or conception flaw that affects one BMS may also affect the redundant BMS as well, so that the gain in reliability can be limited. The present disclosure provides at least approaches to increase the reliability of the detection of malfunctions of battery cells in an electric vehicle, such as an electric aircraft. Redundant monitoring of parameters of each battery cell can be performed with two different circuits. Because a second, redundant monitoring circuit may include non-programmable, non-stateful components rather than processors, sequential logic electronic components, or programmable combinational logic electronic components, its certification can be easier, and its reliability may be increased. For example, because the second, redundant circuit may be processorless, may not include any sequential or programmable combinational logic electronic components, and may not rely on any software (for example, executable program code that is executed by a processor), its certification is made easier than if the second, redundant circuit relied on processors, sequential or programmable combinational logic electronic components, or software.

The second, redundant monitoring circuit can provide for a redundant monitoring of battery parameters and for a redundant transmission of those parameters, or warning signals depending on those parameters. The second battery monitoring system may transmit analog or binary signals but not multivalued digital signals. The second battery monitoring circuit may not manage the charge and discharge of battery cells, but instead provide for monitoring of battery parameters, and transmission of parameters or warning signals. Therefore, the second, redundant battery monitoring circuit can be made simple, easy to certify, and reliable.

Figure 3:
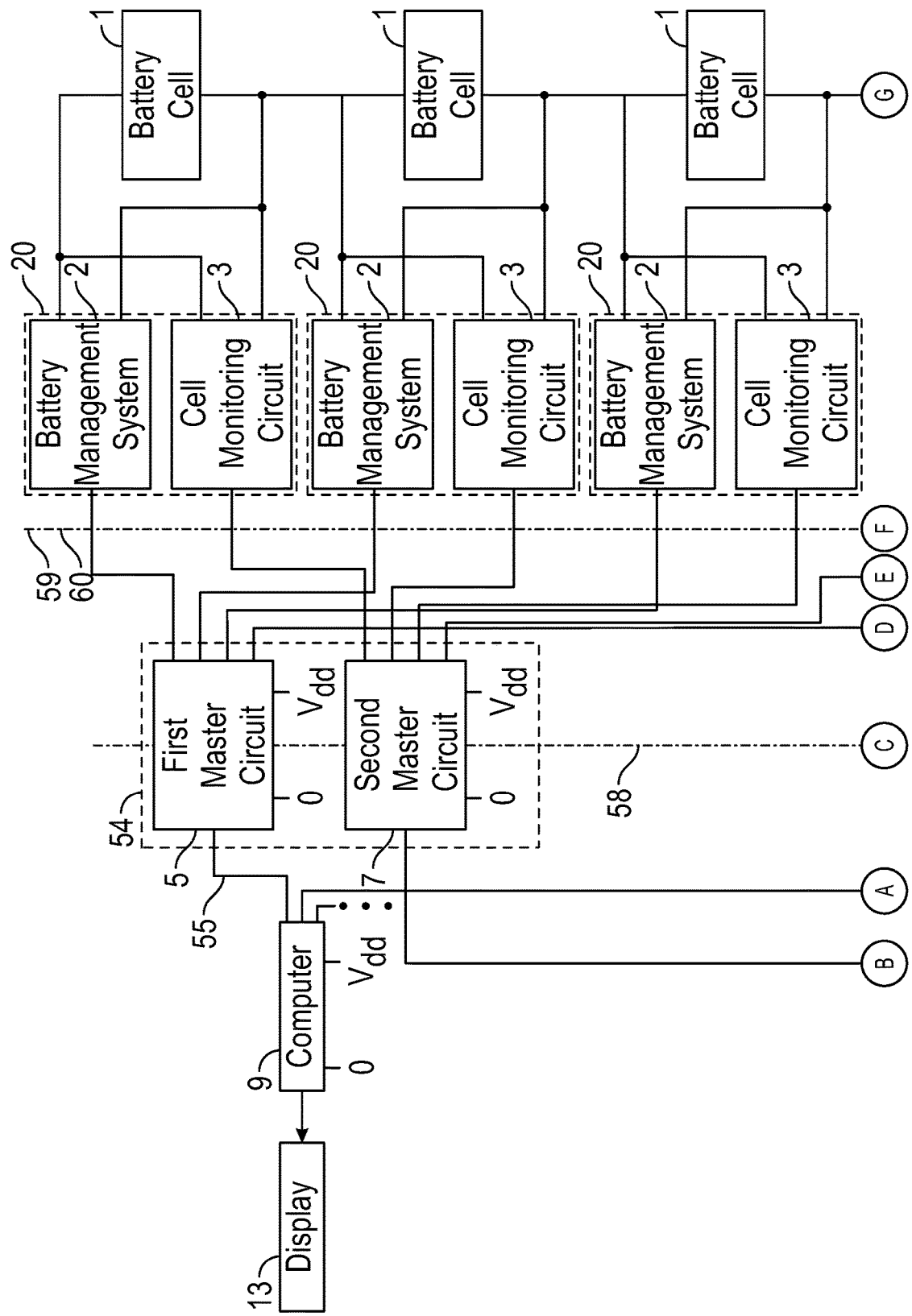
FIG. 3 illustrates an aircraft monitoring system.
Figure 3:
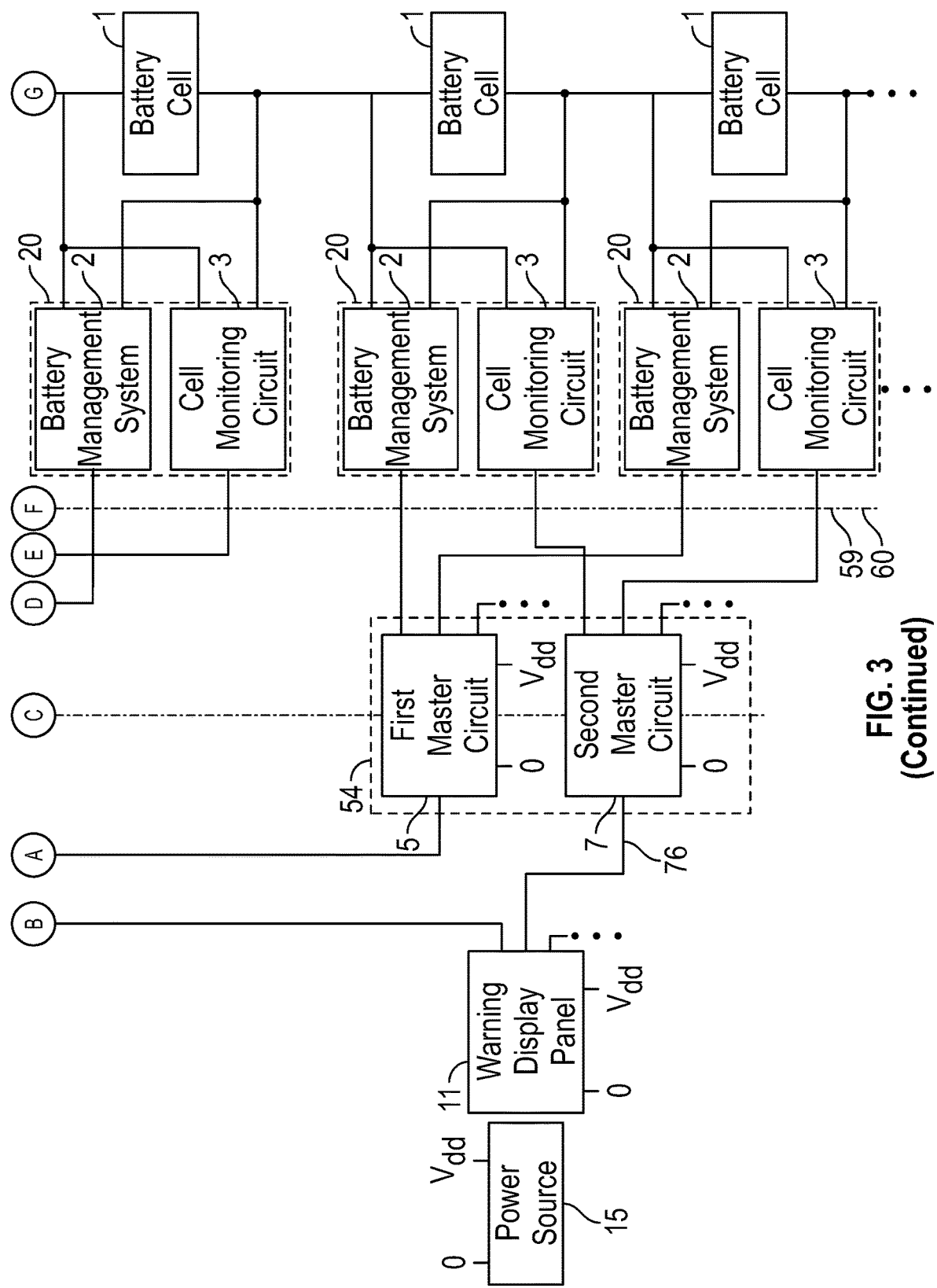

FIG. 3 illustrates a battery monitoring system. This system can be used in an electric vehicle, such as an electric aircraft, a large size drone or unmanned aerial vehicle, an electric car, or the like, to monitor the state of battery cells 1 in one of multiple battery packs and report this state or generate warning signals in case of dysfunctions.

The battery cells 1 can be connected in series or in parallel to deliver a desired voltage and current. FIG. 3 shows serially connected battery cells. The total number of battery cells 1 may exceed 100 cells in an electric aircraft. Each of the battery cells 1 can be made up of multiple elementary battery cells in parallel.

Figure 4:
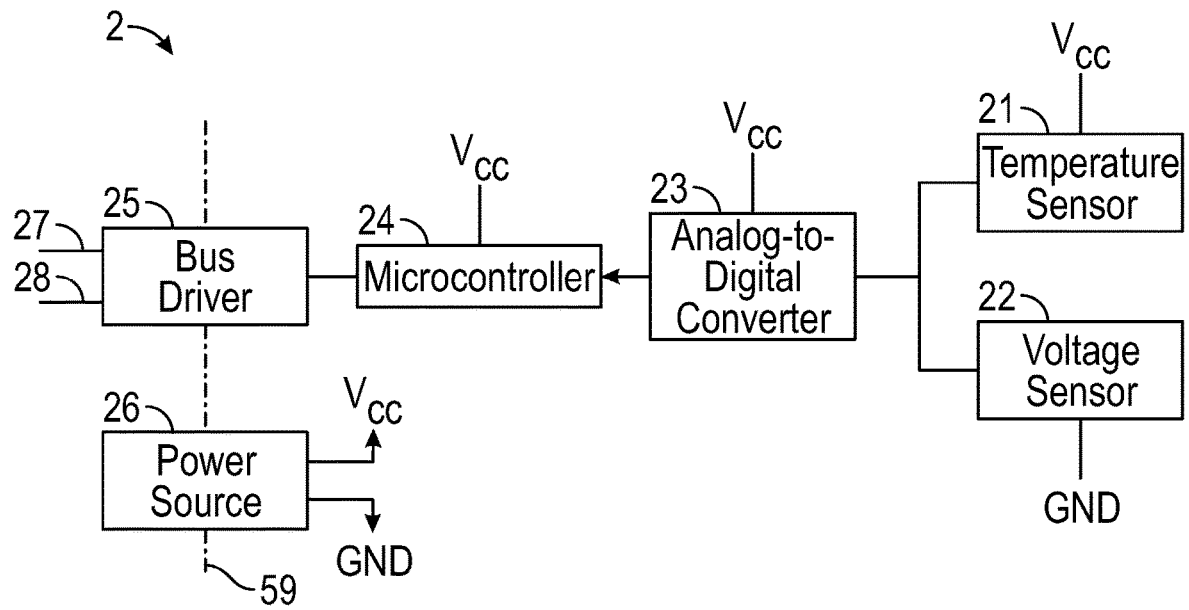
FIGS. 4 and 5 illustrate implementations of battery monitoring systems.

A first battery monitoring circuit can control and monitor the state of each battery cell 1. The first battery management circuit can include multiple BMSs 2, each of the BMSs 2 managing and controlling one of the battery cells 1. The BMSs 2 can each be made up of an integrated circuit (for instance, a dedicated integrated circuit) mounted on one printed circuit board (PCB) of the PCBs 20. One of the PCBs 20 can be used for each of the battery cells 1. FIG. 4 illustrates example components of one of the BMSs 2.

The control of a battery cell can include control of its charging and discharge cycles, preventing a battery cell from operating outside its safe operating area, or balancing the charge between different cells.

The monitoring of one of the battery cells 1 by one of the BMSs 2 can include measuring parameters of the one of the battery cells 1, to detect and report its condition and possible dysfunctions. The measurement of the parameters can be performed with battery cell parameter sensors, which can be integrated in the one of the BMSs 2 or connected to the one of the BMSs 2. Examples of such parameter sensors can include a temperature sensor 21, a voltage sensor 22, or a current sensor. An analog-to-digital converter 23 can convert the analog values measured by one or more of the parameter sensors into multivalued digital values, for example, 8 or 16 bits digital parameter values. A microcontroller 24, which can be part of each of the BMSs 2, can compare the values with thresholds to detect when a battery cell temperature, battery cell voltage, or battery cell current is outside a range.

The BMSs 2 as slaves can be controlled by one of multiple first master circuits 5. In the example of FIG. 3, each of the first master circuits 5 can control four of the BMSs 2. Each of the first master circuits 5 can control eight of the BMSs 2, or more than eight of the BMSs 2. The first master circuits 5 can control more BMS and more battery cells in yet other implementations. The first master circuits 5 can be connected and communicate over a digital communication bus 55.

The first master circuits 5 can also be connected to a computer 9 that collects the various digital signals and data sent by the first master circuits 5, and may display information related to the battery state and warning signals on a display 13, such as a matrix display. The display 13 may be mounted in the vehicle's cockpit to be visible by the vehicle's driver or pilot. Additionally or alternatively, the computer 9 can output the information to a computer remote from the aircraft or to control operations of one or more components of the aircraft as described herein.

The BMSs 2 can be connected to the first master circuits 5 over a digital communication bus, such as a CAN bus. A bus driver 25 can interface the microcontroller 24 with the digital communication bus and provide a first galvanic isolation 59 between the PCBs 20 and the first master circuits 5. In one example, the bus drivers of adjacent BMSs 2 can be daisy chained. For example, as shown in FIG. 4, the bus driver 25 is connected to the bus driver 27 of the previous BMS and to the bus driver 28 of the next BMS.

Each of the BMSs 2 and their associated microcontrollers can be rebooted by switching its power voltage Vcc. The interruption of Vcc can be controlled by the first master circuits 5 over the digital communication bus and a power source 26.

Figure 6:
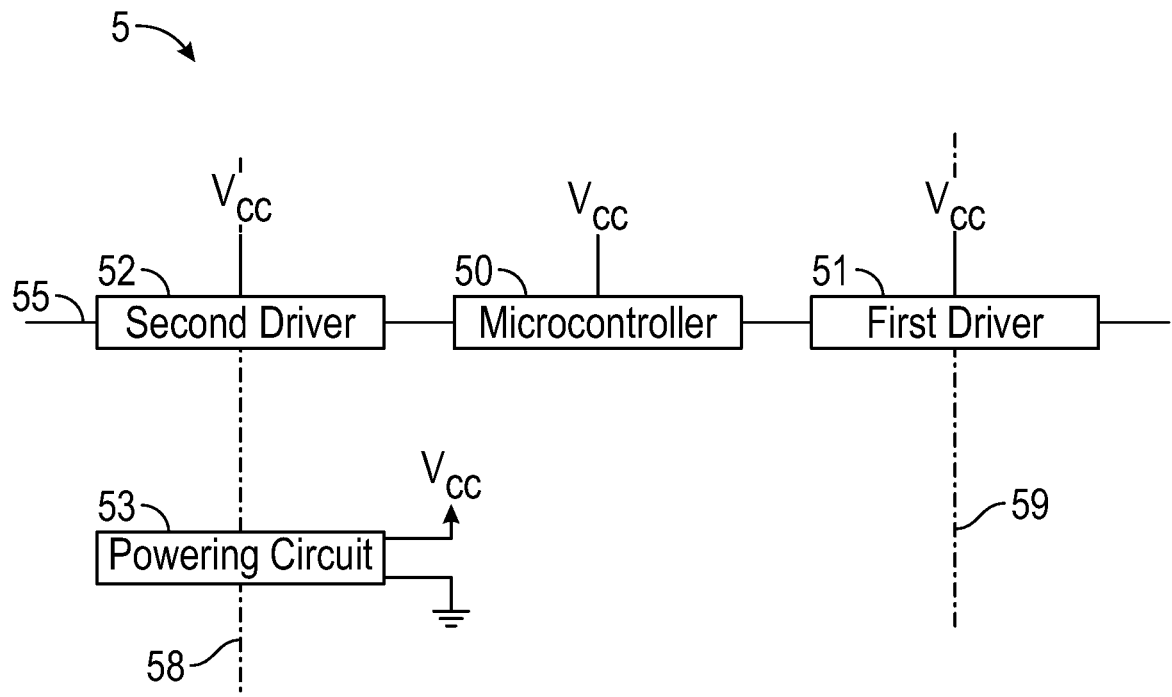
FIGS. 6 and 7 illustrate implementations of master circuits for monitoring battery monitoring systems.

FIG. 6 illustrates example components of one of the first master circuits 5. The one of the first master circuits 5 can include a first driver 51 for connecting the one of the first master circuits 5 with one of the BMSs 2 over the digital communication bus, a microcontroller 50, and a second driver 52 for connecting the first master circuits 5 between themselves and with the computer 9 over a second digital communication bus 55, such as a second CAN bus. A second galvanic isolation 58 can be provided between the first and second master circuits 5, 7 and the computer 9. The second galvanic isolation 58 can, for example, be 1500 VDC, 2500 Vrms, 3750 Vrms, or another magnitude of isolation. The microcontroller 50, the first driver 51, and the second driver 52 can be powered by a powering circuit 53 and may be mounted on a PCB 54, one such PCB can be provided for each of the first master circuits 5.

FIG. 3 further illustrates a second battery monitoring circuit, which can be redundant of the first battery monitoring circuit. This second battery monitoring circuit may not manage the battery cells 1; for example, the second battery monitoring circuit may not control charge or discharge cycles of the battery cells 1. The function of the second battery monitoring circuit can instead be to provide a separate, redundant monitoring of each of the battery cells 1 in the battery packs, and to transmit those parameters or warning signals related to those parameters, such as to the pilot or driver or a computer aboard or remote from the aircraft as described herein. The second battery monitoring circuit can monitor the state of each of the battery cells 1 independently from the first battery monitoring circuit. The second battery monitoring circuit can include one of multiple cell monitoring circuits 3 for each of the battery cells. The parameters or warning signals may moreover, for example, be used by the second battery monitoring circuit to stop charging (for instance, by opening a relay to disconnect supply of power) of one or more battery cells when the one or more battery cells may be full of energy and a computer of the aircraft continues to charge the one or more battery cells.

Figure 5:
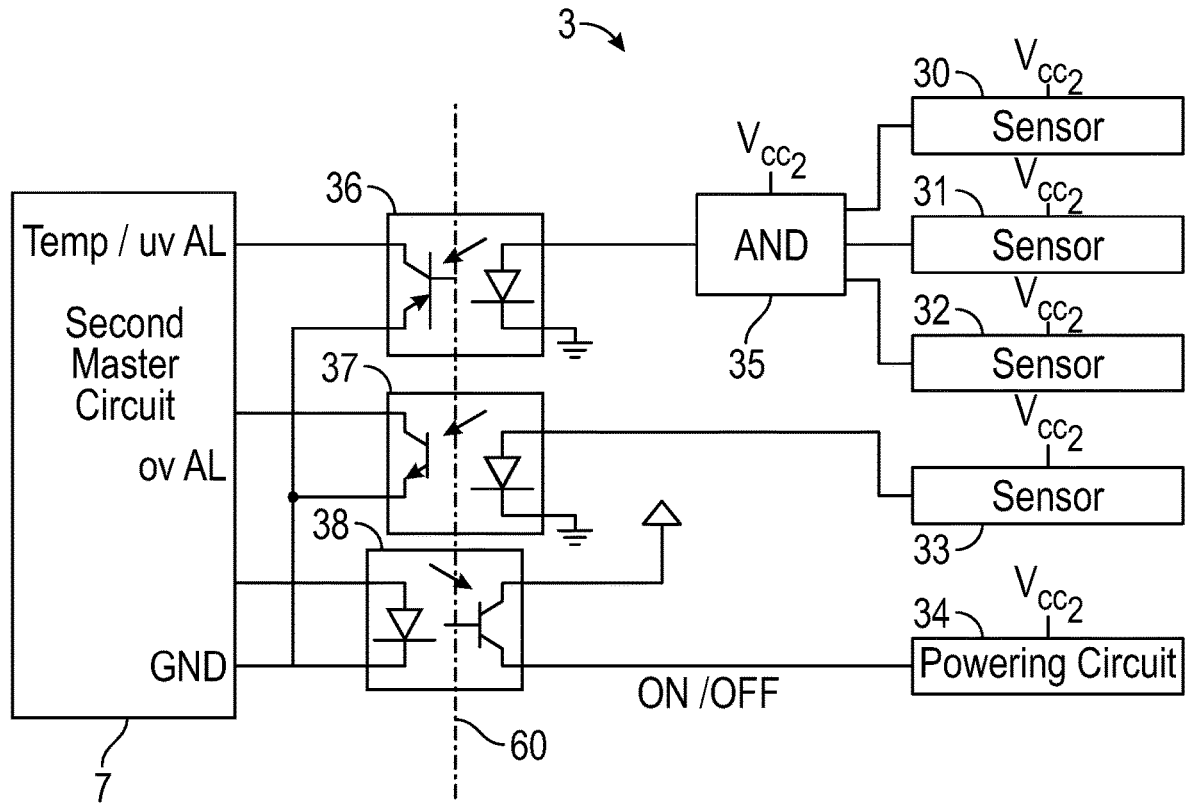

FIG. 5 illustrates example components of one of the cell monitoring circuits 3. Each of the cell monitoring circuits 3 can include multiple cell parameter sensors 30, 31, 32, 33 for measuring various parameters of one of the battery cells 1. The sensor 30 can measure a first temperature at a first location in one battery cell and detect an overtemperature condition; the sensor 31 can measure a second temperature at a second location in the same battery cell and detect an overtemperature condition; the sensor 32 can detect an undervoltage condition in the same battery cell; and the sensor 33 can detect an overvoltage condition on the same battery cell. The undervoltage condition can be detected, for example, when the voltage at the output of one battery cell is under 3.1 Volts or another threshold. The overvoltage condition might be detected, for example, when the voltage at the output of one battery cell is above 4.2 Volts or yet another threshold. The thresholds used can depend, for instance, on the type of battery cell 1 or a number of elementary cells in the cell. Therefore, each or some of the sensors 30-33 can include a sensor as such and an analog comparator for comparing the value delivered by the sensor with one or two thresholds, and outputting a binary value depending on the result of the comparison. Other battery cell parameter sensors, such as an overcurrent detecting sensor, can be used in other implementations.

Various parameters related to one of the battery cells 1 can be combined using a combinational logic circuit 35, such as an AND gate. The combinational logic circuit 35 may not include programmable logic. In the example of FIG. 5, binary signals output by the sensors 30, 31, and 32 are combined by a boolean AND gate into a single warning signal, which can have a positive value (warning signal) if and only if the temperature measured by the two temperature sensors exceeds a temperature threshold and if the voltage of the cell is under a voltage threshold. The detection of an overvoltage condition by the sensor 33, in the example of FIG. 5, may not combined with any other measure and can be directly used as a warning signal.

The warning signals delivered by the combinational logic 35 or directly by the parameter sensors 30-33 can be transmitted to a second master circuit 7 over lines 76, which can be dedicated and different from the digital communication bus used by the first battery monitoring circuit. Optocouplers 36, 37, 38 provide a third galvanic isolation 60 between the components 30-38 and the second master circuit 7. The third galvanic isolation 60 can provide the same isolation as the first galvanic isolation 59, such as 30V isolation, or the third galvanic isolation 60 may provide a different isolation form the first galvanic isolation 59.

The sensors 30-33 and the combinational logic element 35 can be powered by a powering circuit 34 that delivers a power voltage Vcc2. This powering circuit 34 can be reset from the second master circuit 7 using an ON/OFF signal transmitted over the optocoupler 38.

The sensors 30-33 and the combinational logic element 35 can be mounted on a PCB.

One such PCB can be provided for each of the battery cells 1. The sensors 30-33 and the combinational logic element 35 can be mounted on the same PCB 20 as one of the BMSs 2 of the first battery monitoring circuit.

Figure 7:
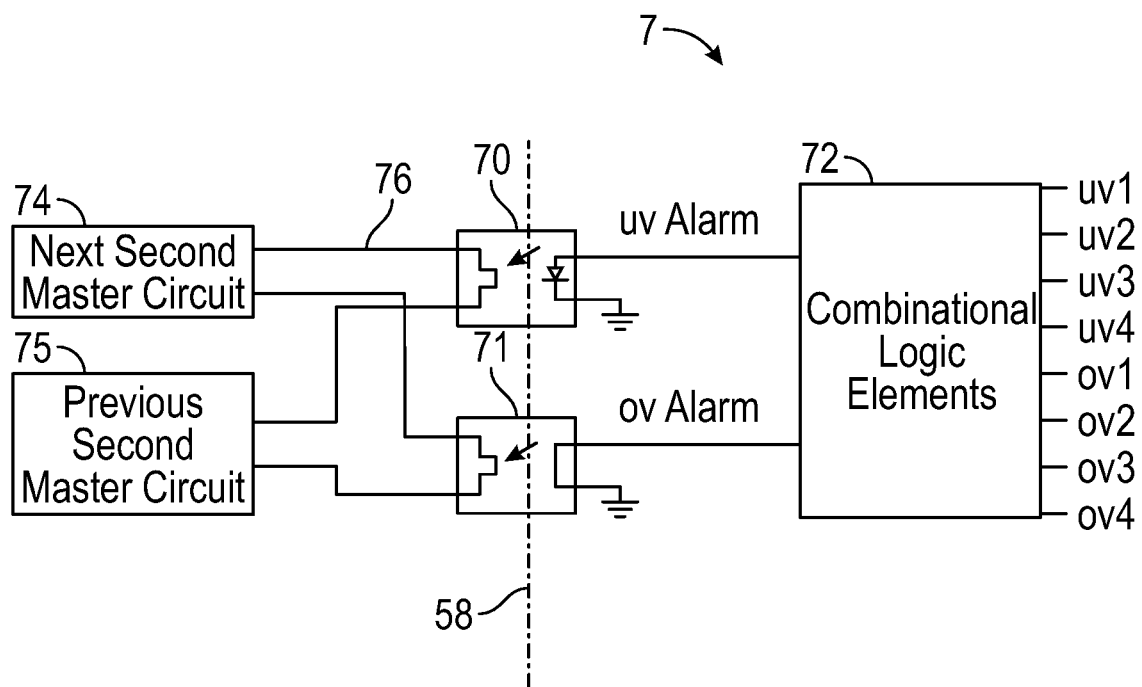

FIG. 7 illustrates example components of one of the second master circuits 7. In the example of FIG. 5, the one of the second master circuits 7 can include a combinational logic element 72, which may not include programmable logic, for combining warning signals, such as overtemperature/under-voltage warning signals uv1, uv2, . . . or overvoltage signals ov1, ov2, . . . from different battery cells into combined warning signals, such as a general uv (undervoltage condition in case of overtemperature) warning signal and a separate overvoltage warning signal ov. Those warning signals uv, ov can be active when any of the battery cells 1 monitored by the one of the second master circuits 7 has a failure. They can be transmitted over optocouplers 70, 71 and lines 76 to the next and previous second master circuits 74, 75, and to a warning display panel 11 in the cockpit of the vehicle for displaying warning signals to the driver or pilot. The warning display panel 11 can include lights, such as light emitting diodes (LEDs), for displaying warning signals.

With the disclosed design of the cell monitoring circuits 3 and the second master circuits 7, no dormant alarms may remain undetected. For example, if a cable may be broken or a power supply is inactive, the warning panel 11 can correctly show an alarm despite the broken cable or the inactive power supply. This can be accomplished, for instance, by using an inverted logic so that if the warning panel 11 does not receive a voltage or a current on an alarm line, an indicator may activate, but if the warning panel 11 does receive the voltage or the current on the alarm line, the indicator can deactivate.

The one of the second master circuits 7 can be mounted on a PCB. One such PCB can be provided for each of the second master circuits 7. One of the second master circuits 7 can be mounted on the same PCB 54 as one of the first master circuits 5 of the first battery monitoring circuit.

As can be seen, the second battery monitoring circuit can include exclusively non-programmable, non-stateful components (such as, analog components or non-programmable combinational logic components). The second battery monitoring circuit can be processorless, and may not include any sequential or programmable combinational logic. The second battery monitoring circuit may not run any computer code or be programmable. This simplicity can provide for a very reliable second monitoring circuit, and for a simple certification of the second battery monitoring circuit and an entire system that include the second battery monitoring circuit.

The second battery monitoring circuit can be built so that any faulty line, components, or power source triggers an alarm. In one example, an "0" on a line, which may be caused by the detection of a problem in a cell or by a defective sensor, line, or electronic component, can be signaled as an alarm on the warning panel; the alarm may only be removed when all the monitored cells and all the monitoring components are functioning properly. For example, if the voltage comparator or temperature sensor is broken, an alarm can be triggered.

The computer 9, the display 13, and the warning display panel 11 in the cockpit can be powered by a power source 15 in the cockpit, which may be a cockpit battery and can be independent of other power sources used to power one or more other components.

Motor and Battery System

Battery packs including multiple battery cells, such as lithium-ion cells, can be used in electric cars, electric aircraft, and other electric self-powered vehicles. The battery cells can be connected in series or in parallel to deliver an appropriate voltage and current.

In electrically driven aircraft, the battery packs can be chosen to fulfill the electrical requirements for various flight modes. During short time periods like take off, the electrical motor can utilize a relatively high power. During most of the time, such as in the standard flight mode, the electrical motor can utilize a relatively lower power, but may consume a high energy for achieving long distances of travel. It can be difficult for a single battery to achieve these two power utilizations.

The use of two battery packs with different power or energy characteristics can optimize the use of the stored energy for different flight conditions. For example, a first battery pack can be used for standard flight situations, where high power output may not be demanded, but a high energy output may be demanded. A second battery pack can be used, alone or in addition to the first battery pack, for flight situations with high power output demands, such as take-off maneuvering.

An electrical powering system can charge the second battery pack from the first battery pack. This can allow recharging of the second battery pack during the flight, subsequent to the second battery pack being used in a high power output demanding flight situation. Therefore, the second battery pack can be small, which can save space and weight. In addition, this can allow different battery packs for different flight situations that optimize the use of the battery packs.

The electrical powering system can also charge the second battery pack by at least one motor which works as generator (the motor may also accordingly be referred to as a transducer). This can allow recharging of the second battery pack during the flight or after the second battery pack has been used in a high power output demanding flight situation. Therefore, the second battery pack can be small, which can save space and weight. In addition, the different battery packs can allow the recovery of braking energy. Braking energy during landing or sinking recovered by a generator motor can create high currents which may not be recovered by battery packs used for traveling long distances. By using a second battery pack suitable for receiving high power output in a short time, more braking energy can be recovered via the second battery pack than the first battery pack, for example.

The electrical powering system can also include a third battery pack, which includes a supercapacitor. Because supercapacitors can receive and output large instantaneous power or high energy in a short duration of time, the third battery pack can further improve the electrical powering system in some instances. A supercapacitor may, for example, have a capacitance of 0.1 F, 0.5 F, 1 F, 5 F, 10 F, 50 F, 100 F, or greater or within a range defined by one of the preceding capacitance values.

FIGS. 8 to 13 illustrate multiple electrical power systems.

Figure 8:
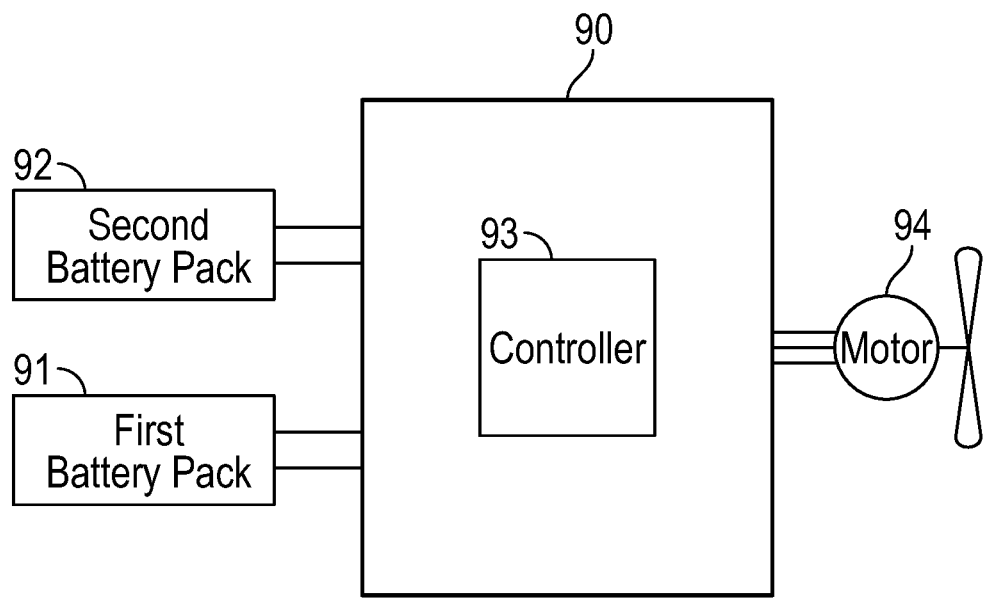
FIGS. 8, 9, 10, 11, 12, and 13 illustrate schematic views of implementations of a power management system.

FIG. 8 shows an electrical powering system that includes a first battery pack 91, a second battery pack 92, a circuit 90, and at least one motor 94.

The first battery pack 91 and the second battery pack 92 can each store electrical energy for driving the at least one motor 94. The first battery pack 91 and the second battery pack 92 can have different electrical characteristics. The first battery pack 91 can have a higher energy capacity per kilogram than the second battery pack 92, and the first battery pack 91 can have a higher power capacity (watt hours) than the second battery pack 92. Moreover, the first battery pack 91 can have a lower maximum, nominal, or peak power than the second battery pack 92; the first battery pack 91 can have a lower maximum, nominal, or peak current than the second battery pack 92; or, the first battery pack 91 can have a lower maximum, nominal, or peak voltage than the second battery pack 92. More than one or even all of the mentioned electrical characteristics of the first battery pack 91 and the second battery pack 92 can be different. However, only one of the mentioned electrical characteristics may be different or at least one other characteristic than the mentioned electrical characteristics may be different. The first battery pack 91 and the second battery pack 92 can have the same electrical characteristics.

The type or the material composition of the battery cells of the first battery pack 91 and the second battery pack 92 can be different. The type or the material composition of the battery cells of the first battery pack 91 and the second battery pack 92 can be the same, but an amount of copper or an arrangement of conductors can be different. In one example, the first battery pack 91 or the second battery pack 92 can be a lithium-ion (Li-ion) battery or a lithium-ion polymer (Li—Po) battery. The second battery pack 92 may include a supercapacitor (sometimes referred to as a supercap, ultracapacitor, or Goldcap).

The first battery pack 91 can include relatively high energy-density battery cells that can store a high amount of watt-hours per kilogram. The first battery pack 91 can include low power battery cells. The first battery pack 91 can provide a DC voltage/current/power or can be connected by a (two phase or DC) power line with the circuit 90.

The second battery pack 92 can include relatively low energy-density battery cells. The second battery pack 92 can include relatively high power battery cells. The second battery pack 92 can provide a DC voltage/current/power or is connected by a (two phase or DC) power line with the circuit 90.

The first battery pack 91 can form an integrated unit of mechanically coupled battery modules or the first battery pack 91 may be an electrically connected first set of battery modules. Similarly, the second battery pack 92 can form an integrated unit of mechanically coupled battery modules or the second battery pack 92 may be an electrically connected second set of battery modules. Some or all of the battery modules of each of first battery pack 91 or the second battery pack 92 can be stored in one or more areas of a housing of an aircraft, such as a within a wing or nose of the aircraft.

The first battery pack 91 can have a total energy capacity that exceeds a total energy capacity of the second battery pack 92. For example, a ratio of the total energy capacity of the first battery pack 91 and the total energy capacity of the second battery pack 92 can be 2:1, 3:1, 4:1, 5:1, 10:1, 20:1, 40:1, or 100:1 or within a range defined by two of the foregoing ratios.

The electrical powering system can include an external charging interface for charging the first battery pack 91 or the second battery pack 92 when the aircraft is on the ground and connected to a charging station outside of the aircraft.

Each, some, or one of the at least one motor can be an electrical motor. The at least one motor 94 can be connected to the circuit 90. The at least one motor 94 can receive over the circuit 90 electrical energy/power from the first battery pack 91 or the second battery pack 92 to drive the at least one motor 94. For example, the at least one motor 94 can be a three phase motor, such as a brushless motor, which is connected via a three phase AC power line with the circuit 90. However, the at least one motor 94 can instead be a different type of motor, such as any type of DC motor or a one phase AC motor. The at least one motor 94 can move a vehicle, such as an airborne vehicle like an aircraft. The at least one motor 94 can drive a (thrust-generating) propeller or a (lift-generating) rotor. In addition, the at least one motor 94 can also function as a generator. The electrical powering system or the at least one motor 94 can include two or more electrical motors as described further herein.

Figure 11:
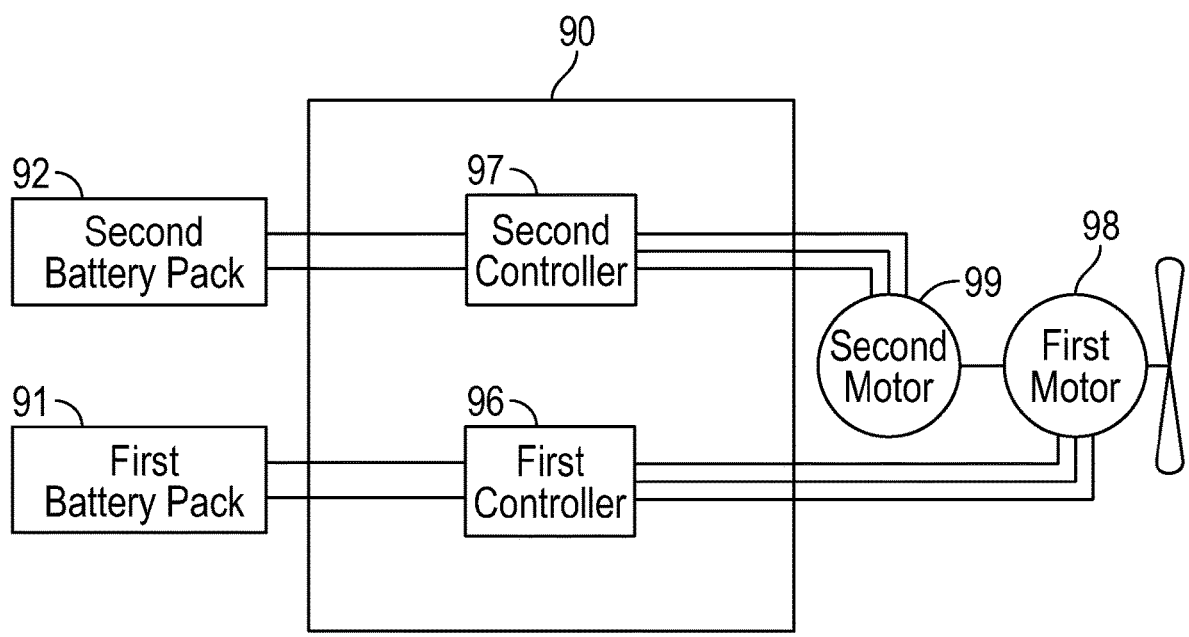
Figure 12:
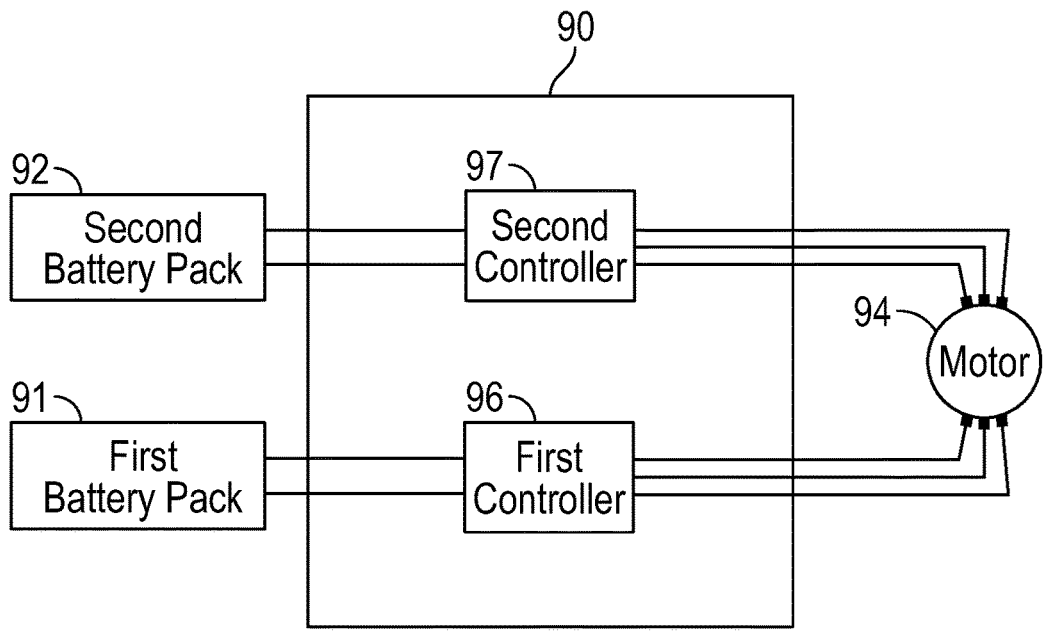
Figure 13:
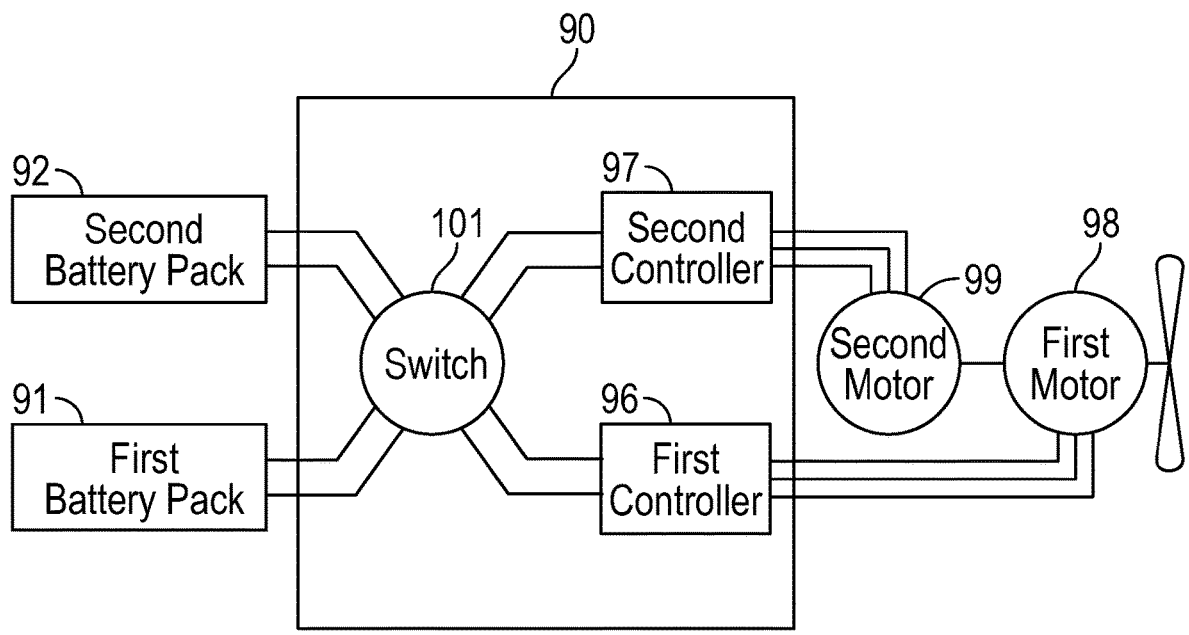

The different motors of the at least one motor 94 can have the same or different characteristics. The at least one motor 94 can be a motor with a first set of windings connected with a first controller 96 and with a second set of windings connected with a second controller 97, as shown for example in FIG. 12. This can allow use of the at least one motor 94 as generator and motor at the same time or to power the at least one motor 94 from the first controller 96 and the second controller 97. The at least one motor 94 can include a first motor 98 and a second motor 99 as shown for example in FIGS. 11 and 13. The first and the second motor 98 and 99 can be mechanically connected such that the rotors of the first and second motor 98 and 99 are mechanically coupled, for instance for powering both the same propeller or rotor (as shown in FIGS. 11 and 13). The first and the second motor 98 and 99 can, for example, drive the same axis which rotates the propeller or rotor. However, the first and second motor 98 and 99 may not be mechanically coupled and may drive two distinct propellers or rotors. The at least one motor 94 can include more than two motors M1, M2, . . . Mi which are mutually connected, or multiple mutually connected motors.

The circuit 90 can be connected with the first battery pack 91, the second battery pack 92, and the at least one motor 94.

The circuit 90 can include a controller 93 connected with the first battery pack 91, the second battery pack 92, and the at least one motor 94. The controller 93 can, for example, be connected over a two phase or DC power line with the first battery pack 91 and the second battery pack 92 or connected over a three phase power line with the at least one motor 94. The controller 93 can transform, convert, or control the power received from the first battery pack 91 or the second battery pack 92 into motor driving signals for driving the at least one motor 94. The controller 93 can include a power converter for converting the DC current of the first battery pack 91 or the second battery pack 92 into a (three phase) (AC) current for the at least one motor 94 (power converter working as inverter). The power converter can treat different input DC voltages (if the first battery pack 91 and the second battery pack 92 have different DC voltages). If the at least one motor 94 acts as generator, the power converter can convert the current generated from each phase of the at least one motor 94 into a DC current for loading the first battery pack 91 or the second battery pack 92 (power converter working as rectifier). The controller 93 can create the motor driving signals for the at least one motor 94 based on user input.

Figure 10:
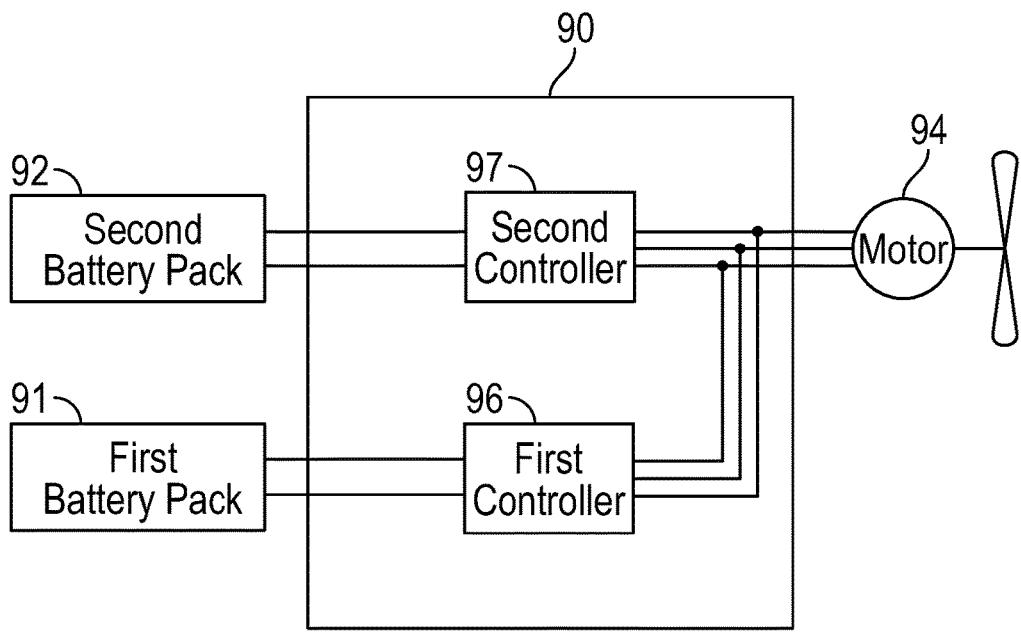

The controller 93 can include more than one controller. The controller 93 can include, for instance, a first controller 96 for powering the at least one motor 94 from at least one of the first battery pack 91 and the second battery pack 92 and a second controller 97 for powering the at least one motor 94 from at least one of the first battery pack 91 or the second battery pack 92. The features described for the controller 93 can apply to the first controller 96 or the second controller 97. Examples of such a circuit are shown in the FIGS. 10 to 13. In FIGS. 10 to 12, the first controller 96 powers the at least one motor 94 from the first battery pack 91 and the second controller 97 powers the at least one motor 94 from the second battery pack 92. The first controller 96 and the second controller 97 can power the at least one motor 94 as shown in FIG. 10 or the at least one motor 94 with different driving windings (or poles) as shown in FIG. 12.

As shown in FIGS. 11 and 13, the first controller 96 can drive a first motor 98 and the second controller 97 can drive a second motor 99. The first controller 96 and the second controller 97 can be flexible and drive the first motor 98 or the second motor 99 depending on a switching state of a switch 101 as shown in FIG. 13. The first controller 96 and the second controller 97 can be different. For example, the input DC voltage of the first controller 96 and the second controller 97 from the first battery pack 91 and the second battery pack 92 can be different. However, the first controller 96 and the second controller 97 can instead be identical.

The circuit 90 can select from at least two of the following connection modes. In a first connection mode, the first battery pack 91 can be electrically connected over the controller 93 with the at least one motor 94, while the second battery pack 92 may be electrically disconnected from the at least one motor 94. In the first connection mode, power can flow between the at least one motor 94 and the first battery pack 91, but may not flow between the at least one motor 94 and the second battery pack 92. In a second connection mode, the second battery pack 92 can be electrically connected over the controller 93 with the at least one motor 94, while the first battery pack 91 may be electrically disconnected from the at least one motor 94. In the second connection mode, power can flow between the at least one motor 94 and the second battery pack 92, but may not between the at least one motor 94 and the first battery pack 91. In a third connection mode, the first battery pack 91 and the second battery pack 92 can be electrically connected over the controller 93 with the at least one motor 94. In the third connection mode, power can flow between the at least one motor 94 and the first battery pack 91 and the second battery pack 92. Electrical switches can be used to perform this selection between different connection modes, and the electrical switches can be between the controller 93 and first battery pack 91 and the second battery pack 92, in the controller 93, or between the controller 93 and the at least one motor 94. If the at least one motor 94 has more than one motor, there can be further connection modes. The first battery pack 91 can be connected with the first motor 98 and not the second motor 99 (fourth connection mode) or with the second motor 99 and not the first motor 98 (fifth connection mode) or with the first motor 98 and the second motor 99 (sixth connection mode). The second battery pack 92 can be connected with the first motor 98 and not the second motor 99 (seventh connection mode) or with the second motor 99 and not the first motor 98 (eighth connection mode) or with the first motor 98 and the second motor 99 (ninth connection state). The first battery pack 91 and the second battery pack 92 can be connected with the first motor 98 and not the second motor 99 (tenth connection mode) or with the second motor 99 and not the first motor 98 (eleventh connection mode) or with the first motor 98 and the second motor 99 (twelfth connection state). The numbering of the connection modes can be arbitrarily chosen. If there may additionally be a third battery pack, there can be correspondingly more potential connection modes between the at least one motor and the three battery packs.

The circuit 90 can select from at least two of the following drive modes. In a first drive mode, the at least one motor 94 can be driven by the first battery pack 91 (without using the power of the second battery pack 92). In this first drive mode (which may be referred to as a standard drive mode), the circuit 90 can be in the first connection mode. Alternatively, in the first drive mode, the circuit 90 can also be in the third connection mode, while no power flows from the second battery pack 92 to the at least one motor 94. This standard drive mode can be used when the power consumption of the least one motor 94 may be low, such as during steady flight conditions, gliding flight, or landing of an aircraft. In a second drive mode (which may be referred to as a high energy drive mode), the at least one motor 94 can be driven by the second battery pack 92 (without using the power of the first battery pack 91). In this second drive mode, the circuit 90 can be in the second connection mode. Alternatively, in the second drive mode, the circuit 90 can also be in the third motor connection mode, while no power flows from the first battery pack 91 to the at least one motor 94. This second drive mode can be used when the power consumption of the at least one motor 94 may be high, such as during maneuvering, climb flight, or take off. In a third drive mode (which may be referred to as a very high energy drive mode), the at least one motor 94 can be simultaneously driven by the first battery pack 91 and the second battery pack 92. In this third drive mode, the circuit 90 can be in the third connection mode. This third drive mode can be used when the power consumption of the least one motor 94 may be high, such as during maneuvering, climb flight, or take off.

The circuit 90 can include a detector for detecting the power requirements of a present flight mode. The detection can be performed from user input or sensor measurements, such as by measuring the current in the motor input line. The circuit 90 can select the drive mode or the connection mode based at least on the detection result of this detector.

The selection between connection modes can depend at least on the charging level of the different battery packs. For example, a high-power battery pack can be used instead, or in addition to, a high energy-density battery pack when the charge of the high energy-density battery pack is low.

The electrical powering systems of FIGS. 8 to 13 can be configured such that the second battery pack 92 can be charged from the first battery pack 91, such as via the circuit 90. Moreover, the electrical powering systems can be configured such that the second battery pack 92 can be charged from the first battery pack 91 while the first battery pack 91 powers or drives the at least one motor 94.

Figure 9:
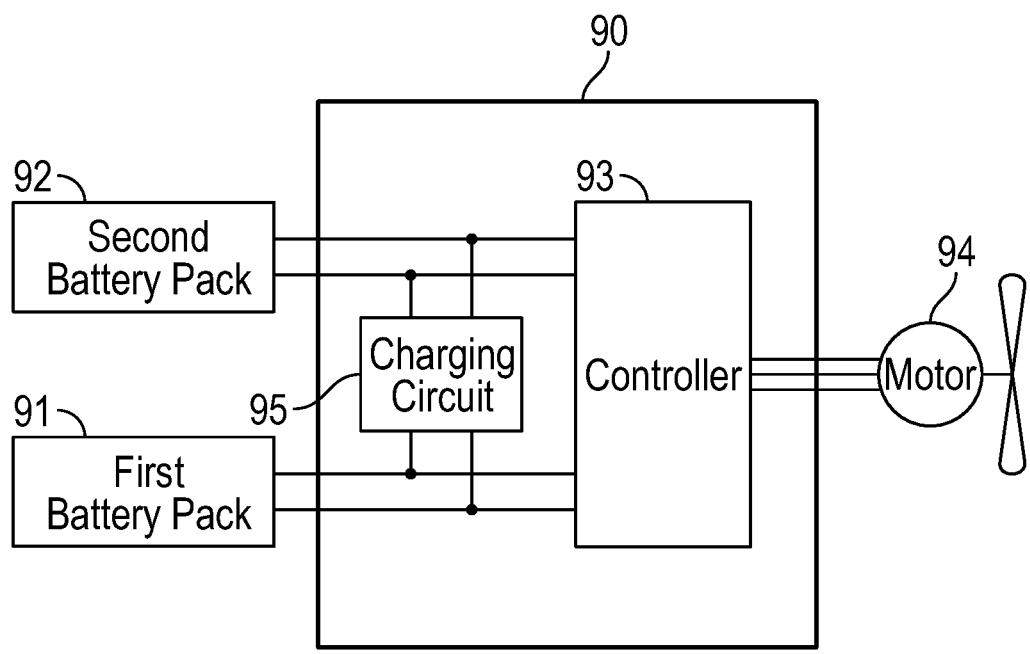

In FIGS. 9 to 11, the circuit 90 can electrically connect the first battery pack 91 and the second battery pack 92 for charging. The connection can be steady or realized by a switch which switches between a first battery connection mode in which the first battery pack 91 and the second battery pack 92 are electrically connected and a second battery connection mode in which the first battery pack 91 and the second battery pack 92 are electrically disconnected. As explained further herein, the first battery connection mode can be realized by connecting the first battery pack 91 and the second battery pack 92 over a charging circuit 95 or over the controller 93 or over one or more other controllers.

In FIG. 9, the circuit 90 the charging circuit 95 for charging the second battery pack 92 from the first battery pack 91. The charging circuit 95 can control energy flow from the first battery pack 91 to the second battery pack 92 and may transfer the energy without transferring the energy through the controller 93. The charging circuit 95 can include a switch (not shown) for connecting the first battery pack 91 with the second battery pack 92 for charging. Such a switch may have the advantage that the charging process can be controlled by a user or by a microprocessor. For example, if the full power of the first battery pack 91 is desired to power the at least one motor 94, the process of charging the second battery pack 92 may automatically be interrupted. However, the charging circuit 95 can instead work switchless so that the process of charging automatically starts when a certain electrical parameter, like the voltage or capacitance of the second battery pack 92, falls below a certain threshold.

If the voltage of the first battery pack 91 and the second battery pack 92 may be different, the charging circuit 95 can include a DC/DC converter for converting the DC voltage of the first battery pack 91 into the DC voltage of the second battery pack 92. The second battery pack 92 can be charged from the first battery pack 91 at the same time that the at least one motor 94 is driven by the first battery pack 91 or at a time that the at least one motor 94 is not powered, such as by the first battery pack 91.

In FIG. 10, the second battery pack 92 can be charged over the first controller 96 and the second controller 97. The first battery pack 91 can provide energy and power for the first controller 96, which can convert this energy and power into the electrical driving signals for the at least one motor 94. For charging the second battery pack 92, the electrical driving signals from the first controller 96 can be converted by the second controller 97 into the charging signal (DC voltage) for the second battery pack 92. The electrical driving signals for the at least one motor 94 from the first controller 96 can be used for charging the second battery pack 92 and for driving the at least one motor 94 at the same time. This can allow the second battery pack 92 to charge from the first battery pack 91 at the same time that the at least one motor 94 may be driven by the electrical driving signals from the first controller 96. The second battery pack 92 can however instead be charged by the electrical drive signals without powering the motor at the same time.

Instead of or in addition to electrically connecting the first battery pack 91 with the second battery pack 92 for transferring electrical energy from the first battery pack 91 to the second battery pack 92, the first battery pack 91 can be mechanically connected with the second battery pack 92 for transferring mechanical energy to charge the second battery pack 92 from the first battery pack 91.

In FIG. 11, mechanical charging can be realized by driving the first motor 98 from the first battery pack 91 (over the first controller 96) and generating energy from the second motor 99 which is mechanically connected to the first motor 98 and working as generator. The energy generated by the second motor 99 can be used to charge the second battery pack 92 (by converting the generated motor signals of the second motor 99 via the second controller 97 into the charging signal (DC voltage) of the second battery pack 92). This can allow the second battery pack 92 to charge from the first battery pack 91 at the same time that the at least one motor 94 is driven by the energy from the first battery pack 91.

In FIG. 12, mechanical charging can be realized by driving the at least one motor 94 from the first battery pack 91 (such as over the first controller 96) with the first set of windings of the at least one motor 94 and generating energy from the at least one motor 94 over the second set of windings of the at least one motor 94 which can function as a generator. The energy generated by the second set of windings can be used to charge the second battery pack 92 by converting the generated motor signals of the at least one motor 94 via the second controller 97 into the charging signal (DC voltage) of the second battery pack 92. This can allow the second battery pack 92 to charge from the first battery pack 91 at the same time that the at least one motor 94 is driven by the energy from the first battery pack 91. Moreover, this can enable the second battery pack 92 to charge from the first battery pack 91 without utilizing separate circuitry, such as a DC/DC converter, which would increase a weight of the aircraft.

FIG. 13 shows a switch 101 which can select from different battery packs or connection modes as described herein. This can allow the first battery pack 91 to connect with the second battery pack 92 (first battery connection mode) to charge the second battery pack 92 directly from the first battery pack 91. This can allow the first battery pack 91 to connect with (i) one of the first controller 96 or the second controller 97, (ii) one of the first motor 98 or second motor 99 and the second battery pack 92 with the other of the first controller 96 or the second controller 97, or (iii) the first motor 98 and the second motor 99 to charge the second battery pack 92 mechanically. This can allow for selection of the first motor 98 or the second motor 99 to be driven by the first battery pack 91 or the second battery pack 92.

The design of FIG. 13 can give the flexibility to choose among electrical charging or mechanical charging.

The second battery pack 92 can be charged by the at least one motor 94 which can work as a generator. When the at least one motor 94 may work as a generator, the generation can be driven by braking energy, such as during descent or landing of the aircraft. The second battery pack 92 can as a result recover energy without affecting the functioning of the first battery pack 91 for long distances. When the at least one motor 94 may work as a generator, the generation can be driven from the first battery pack 91 to charge the second battery pack 92. The second battery pack 92 can be charged by the at least one motor 94 working as a generator while the same motor or another motor of the at least one motor 94 can be driven by the energy from the first battery pack 91, such as for instance described with respect to FIGS. 11, 12, and 13.

The electrical powering system can include a third battery pack (not shown). The second battery pack 92 and the third battery pack can have different electrical characteristics. The second battery pack 92 can, for instance, have a higher energy capacity than the third battery pack. The second battery pack 92 can have a higher energy density than the third battery pack. The second battery pack 92 can have a lower maximum, nominal, or peak power than the third battery pack. The second battery pack 92 can have a lower maximum, nominal, or peak current than the third battery pack. The second battery pack 92 can have a lower maximum, nominal, or peak voltage than the third battery pack. The type or the material composition of the battery cells of the second battery pack 92 and the third battery pack can be different or the same. The third battery pack can include a supercapacitor. The third battery pack can increase a maximum power that may be delivered or recovered by the electrical powering system. The power recovered by the at least one motor 94 acting as a generator from a braking action can, for example, immediately be recovered in the third battery pack up to a high recover power level. The third battery pack can be charged from the first battery pack 91 or the second battery pack 92, such as even while the at least one motor 94 may be driven from the power of the first battery pack 91 or the second battery pack 92.

Modular Battery System

The power sources in an electric or hybrid aircraft can be modular and distributed to optimize a weight distribution or select a center of gravity for the electric or hybrid aircraft, as well as maximize a use of space in the aircraft. Moreover, the batteries in an electric or hybrid aircraft can desirably be designed to be positioned in place of a combustion engine so that the aircraft can retain a similar shape or structure to a traditional combustion powered aircraft and yet may be powered by batteries. In such designs, the weight of the batteries can be distributed to match that of a combustion engine to enable the electric or hybrid aircraft to fly similarly to the traditional combustion powered aircraft.

Figure 14A:
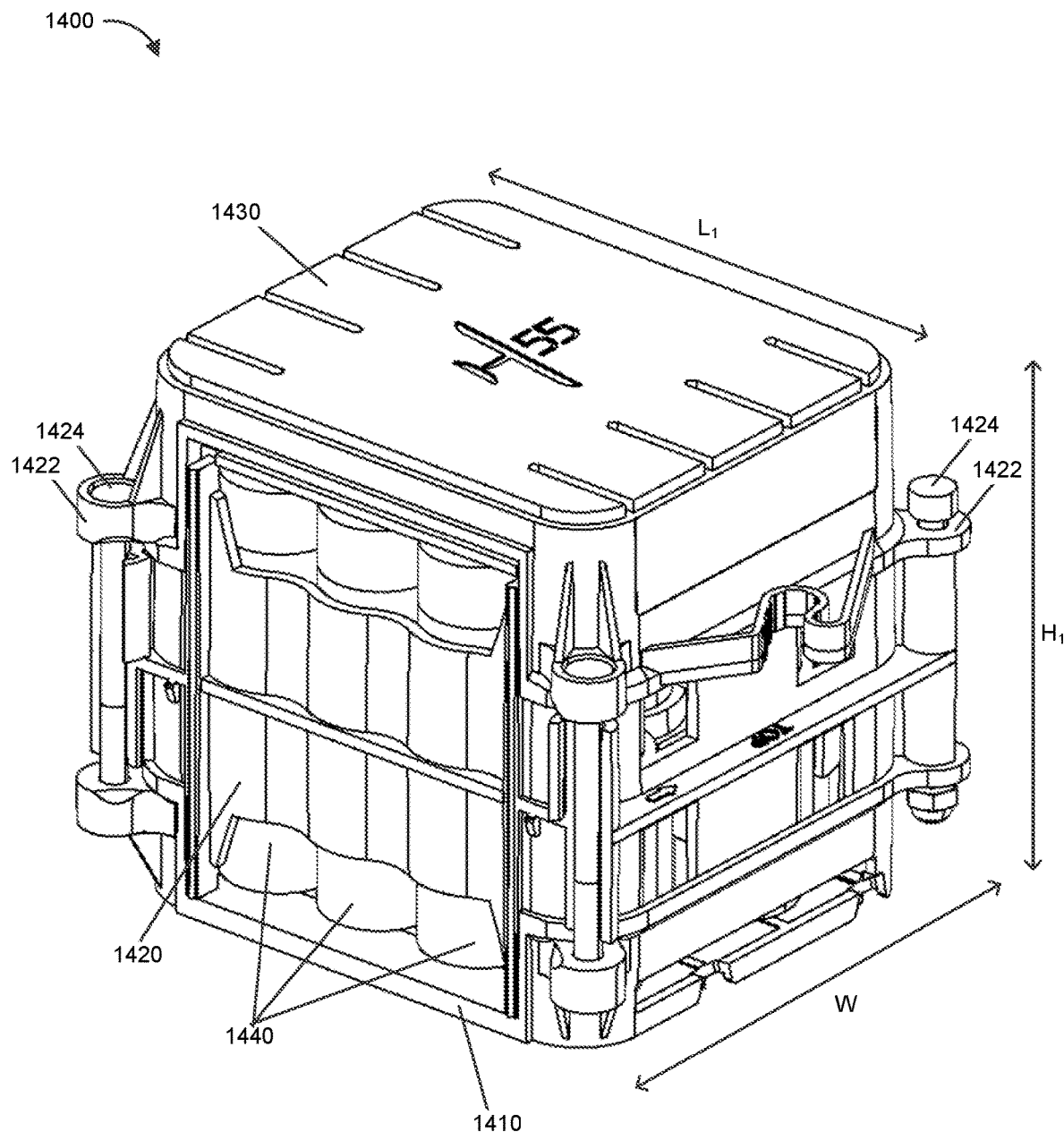
FIGS. 14A and 14B illustrate a battery module usable in an aircraft.

FIG. 14A illustrates a battery module 1400 usable in an aircraft, such as the aircraft 100 of FIGS. 1A and 1B. The battery module 1400 can include a lower battery module housing 1410, a middle battery module housing 1420, an upper battery module housing 1430, and a multiple battery cells 1440. The multiple battery cells 1440 can together provide output power for the battery module 1400. The lower battery module housing 1410, the middle battery module housing 1420, or the upper battery module housing 1430 can include slots, such as slots 1422, that are usable to mechanically couple the lower battery module housing 1410, the middle battery module housing 1420, or the upper battery module housing 1430 to one another or to another battery module. Supports, such as supports 1424 (for example, pins or locks), can be placed in the slots to lock the lower battery module housing 1410, the middle battery module housing 1420, or the upper battery module housing 1430 to one another or to another battery module.

The battery module 1400 can be constructed so that the battery module 1400 is evenly cooled by air. The multiple battery cells 1440 can include 16 total battery cells where the battery cells are each substantially shaped as a cylinder. The lower battery module housing 1410, the middle battery module housing 1420, or the upper battery module housing 1430 can be formed of or include plastic and, when coupled together, have an outer shape substantially shaped as a rectangular prism. The lower battery module housing 1410, the middle battery module housing 1420, or the upper battery module housing 1430 can together be designed to prevent a fire in the multiple battery cells 1440 from spreading outside of the battery module 1400.

The battery module 1400 can have a length of $L_1$, a width of W, and a height of $H_1$. The length of $L_1$, the width of W, or the height of $H_1$ can each be 50 mm, 65 mm, 80 mm, 100 mm, 120 mm, 150 mm, 200 mm, 250 mm or within a range defined by two of the foregoing values or another value greater or less than the foregoing values.

Figure 14B:
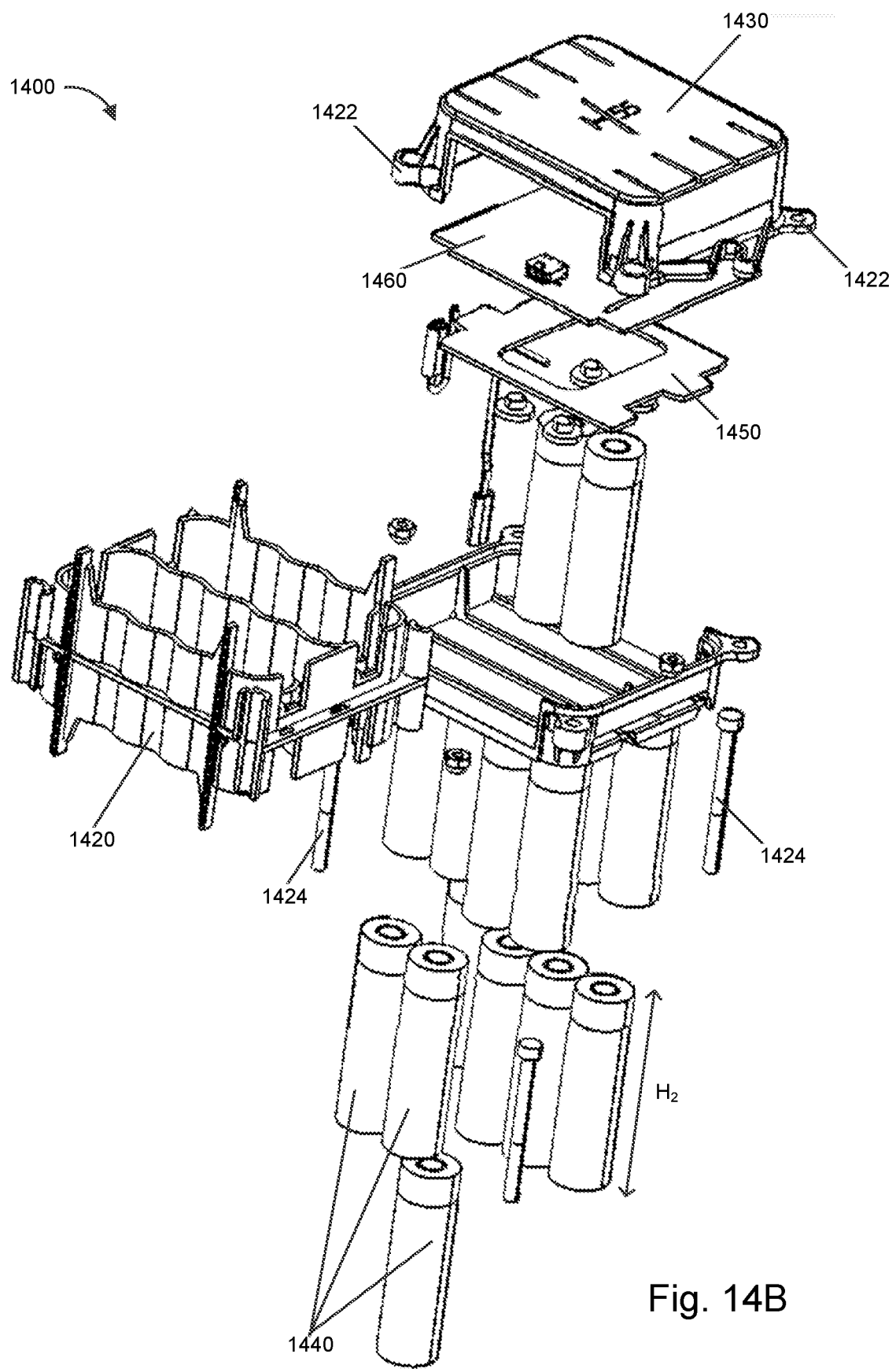

FIG. 14B illustrates an exploded view of the battery module 1400 of FIG. 14A. In the exploded view, a plate 1450 and a circuit board assembly 1460 of the battery module 1400 is shown. The plate 1450 can be copper and may electrically connect the multiple battery cells 1440 in parallel with one another. The plate 1450 may also distribute heat evenly across the multiple battery cells 1440 so that the multiple battery cells 1440 age at the same rate. The circuit board assembly 1460 may transfer power from or to the multiple battery cells 1440, as well as include one or more sensors for monitoring a voltage or a temperature of one or more battery cells of the multiple battery cells 1440. The circuit board assembly 1460 may or may not provide galvanic isolation to the battery module 1400 with respect to any components that may be electrically connected to the battery module 1400. Each of the multiple battery cells 1440 can have a height of $H_2$, such as 30 mm, 50 mm, 65 mm, 80 mm, 100 mm, 120 mm, 150 mm or within a range defined by two of the foregoing values or another value greater or less than the foregoing values.

Figure 15A:
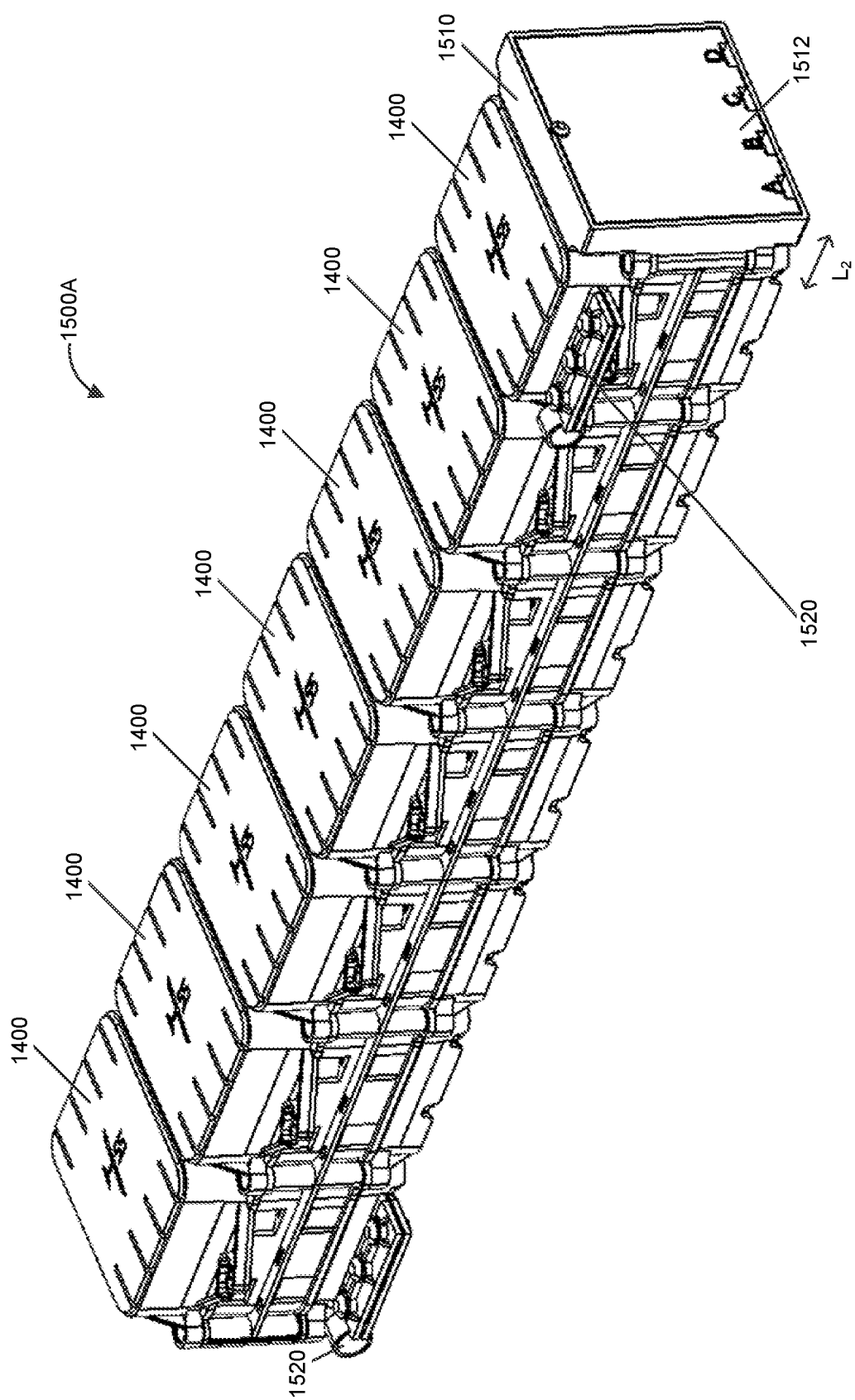
FIGS. 15A and 15B illustrate a power source formed of multiple battery modules.

FIG. 15A illustrate a power source 1500A formed of multiple battery modules 1400 of FIGS. 14A and 14B. The multiple battery modules 1400 of the power source 1500A can be mechanically coupled to one another. A first side of one battery module 1400 can be mechanically coupled to a first side of another battery module 1400, and a second side of the one battery module 1400 that is opposite the first side can be mechanically coupled to a first side of yet another battery module 1400. The multiple battery modules 1400 of the power source 1500A can be electrically connected in series with one another. As illustrated in FIG. 15A, the power source 1500A can include seven of the battery modules 1400 connected to one another. The power source 1500A may, for example, have a maximum power output between 1 kW and 60 kW during operation, a maximum voltage output between 10 V and 120 V during operation, or a maximum current output between 100 A and 500 A during operation.

The power source 1500A can include a power source housing 1510 mechanically coupled to at least one of the battery modules. The power source housing 1510 can include an end cover 1512 that covers a side of the power source housing 1510. The power source housing 1510 can have a length of $L_2$, such as 3 mm, 5 mm, 10 mm, 15 mm, 20 mm, 25 mm, 30 mm, 40 mm, 50 mm or within a range defined by two of the foregoing values or another value greater or less than the foregoing values. The width and the height of the power source housing 1510 can match the length of $L_1$ and the width of W of the battery module 1400.

The power source 1500A can include power source connectors 1520. The power source connectors 1520 can be used to electrically connect the power source 1500A to another power source, such as another of the power source 1500A.

Figure 15B:
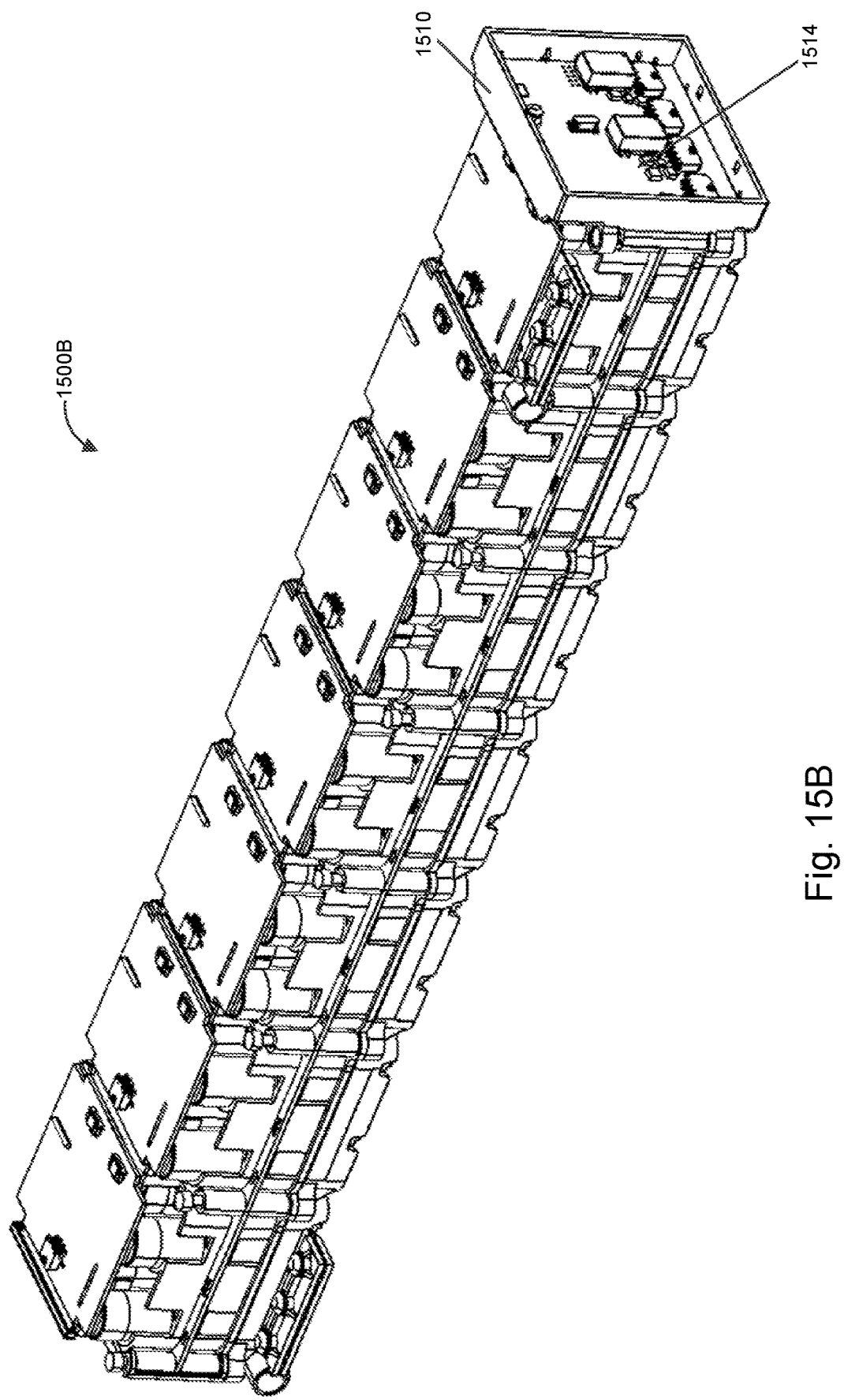

FIG. 15B illustrates a power source 1500B that is similar to the power source 1500A of FIG. 15A but with the end cover 1512 and the upper battery module housings 1430 of the battery modules 1400 removed. Because the end cover 1512 has been removed, a circuit board assembly 1514 of the power source 1500B is now exposed. The circuit board assembly 1514 can be electrically coupled to the battery modules 1400. The circuit board assembly 1514 can additionally provide galvanic isolation (for instance, 2500 Vrms) for the power source 1500B with respect to any components that may be electrically connected to the power source 1500B. The inclusion of galvanic isolation in this manner may, for instance, enable grouping of the battery modules 1400 together so that isolation may be provided to the grouping of the battery modules 1400 rather than individual modules of the battery modules 1400 or a subset of the battery modules 1400. Such an approach may reduce the costs of construction because isolation can be expensive, and a single isolation may be used for multiple of the battery modules 1400.

Figure 16:
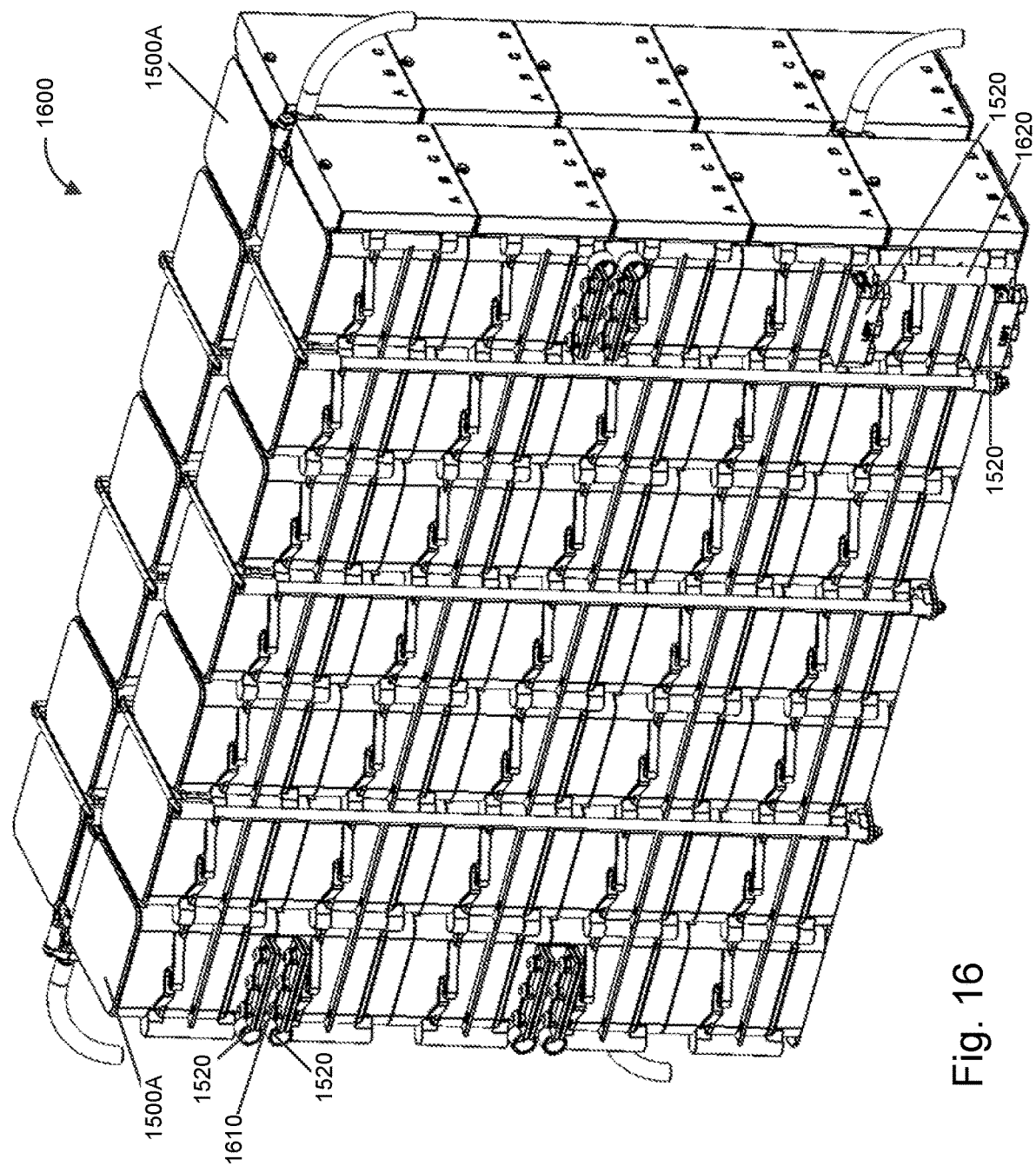
FIG. 16 illustrates multiple power sources arranged and connected for powering an aircraft.

FIG. 16 illustrates a group 1600 of multiple power sources 1500A of FIG. 15A arranged and connected for powering an aircraft, such as the aircraft 100 of FIGS. 1A and 1B. The multiple power sources 1500A of the group 1600 can be mechanically coupled to or stacked on one another. The multiple power sources 1500A of the group 1600 can be electrically connected in series or parallel with one another, such as by a first connector 1610 or a second connector 1620 that electrically connects the power source connectors 1520 of two of the multiple power sources 1500A. As illustrated in FIG. 16, the group 1600 can include 10 power sources (for instance, arranged in a 5 row by 2 column configuration). In other examples, a group may include a fewer or greater number of power sources, such as 2, 3, 5, 7, 8, 12, 15, 17, 20, 25, 30, 35, or 40 power sources.

The grouping of the multiple power sources 1500A to form the group 1600 or another different group may allow for flexible configurations of the multiple power sources 1500A to satisfy various space or power requirements. Moreover, the grouping of the multiple power sources 1500A to form the group 1600 or another different group may permit relatively easy or inexpensive replacement of one or more of the multiple power sources 1500A in the event of a failure or other issue.

Figure 17A:
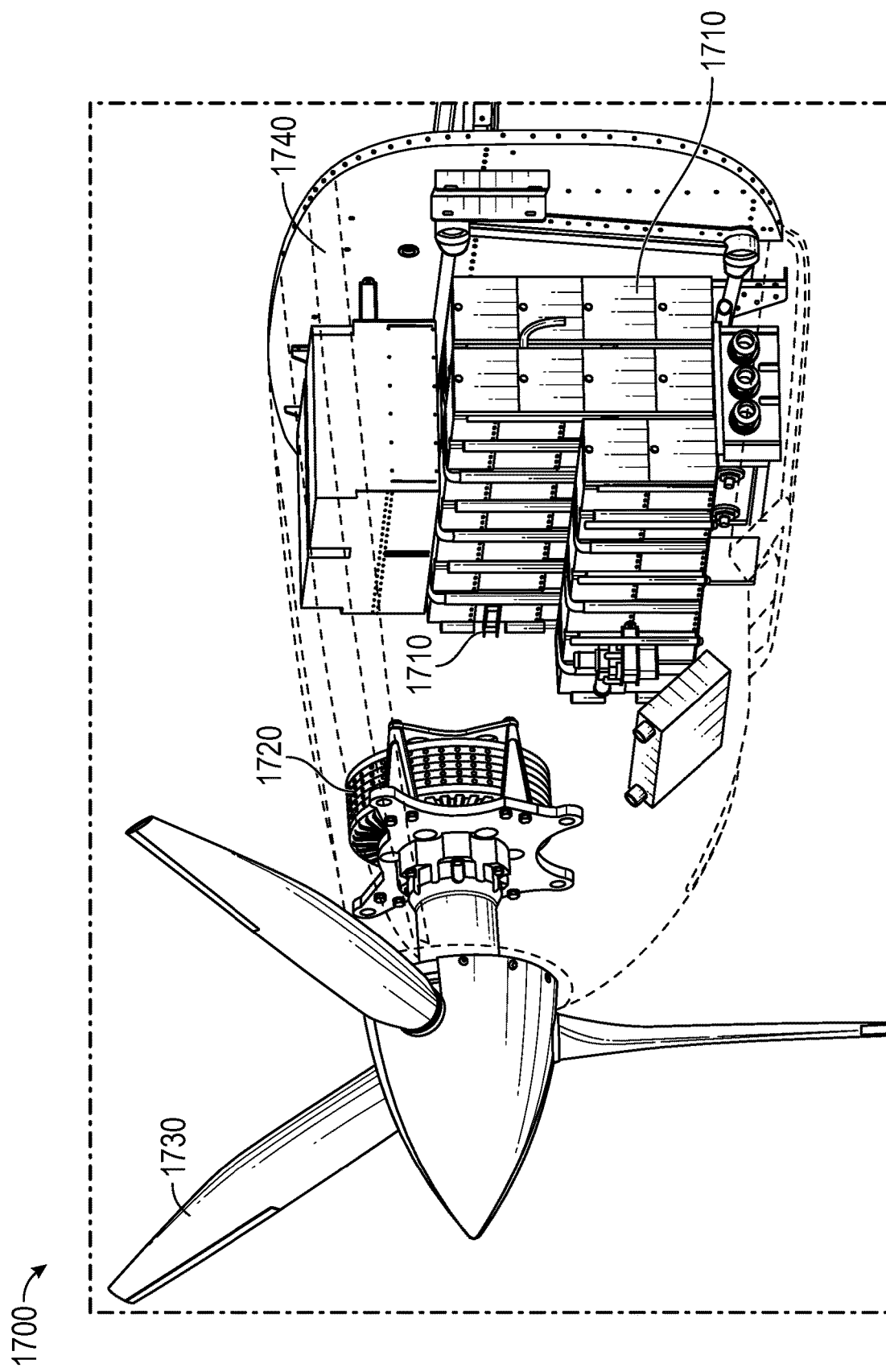
FIGS. 17A and 17B illustrate multiple power sources positioned in a nose of an aircraft for powering the aircraft.

FIG. 17A illustrates a perspective view of a nose 1700 of an aircraft, such as the aircraft 100 of FIGS. 1A and 1B, that includes multiple power sources 1710, such as multiple of the power source 1500A, for powering a motor 1720 that operates a propeller 1730 of the aircraft. The multiple power sources 1710 can be used to additionally or alternatively power other components of the aircraft. The multiple power sources 1710 can be sized and arranged to optimize a weight distribution and use of space around the nose 1700. The motor 1720 and the propeller 1730 can be attached to and supported by a frame of the aircraft by supports, which can be steel tubes, and connected by multiple fasteners, which be bolts with rubber shock absorbers. A firewall 1740 can provide barrier between the multiple power sources 1710 and the frame of the aircraft in the event of a first at the multiple power sources 1710. An enclosure composed of glass fiber, metal, or mineral composite can be around the multiple power sources 1710 to protect from water, coolant, or fire.

Figure 17B:
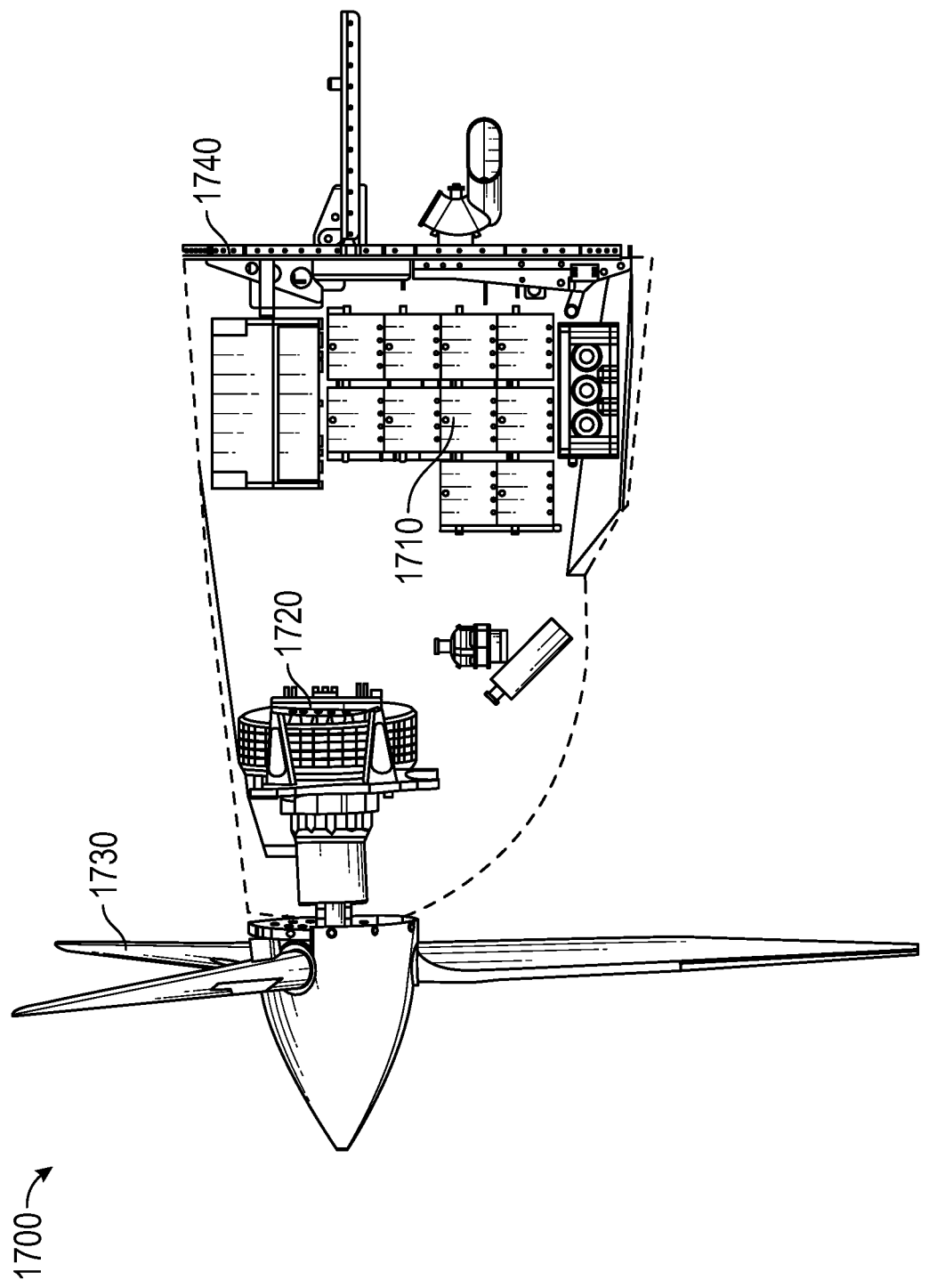

FIG. 17B illustrates a side view of the nose 1700 of FIG. 17A.

Figure 18A:
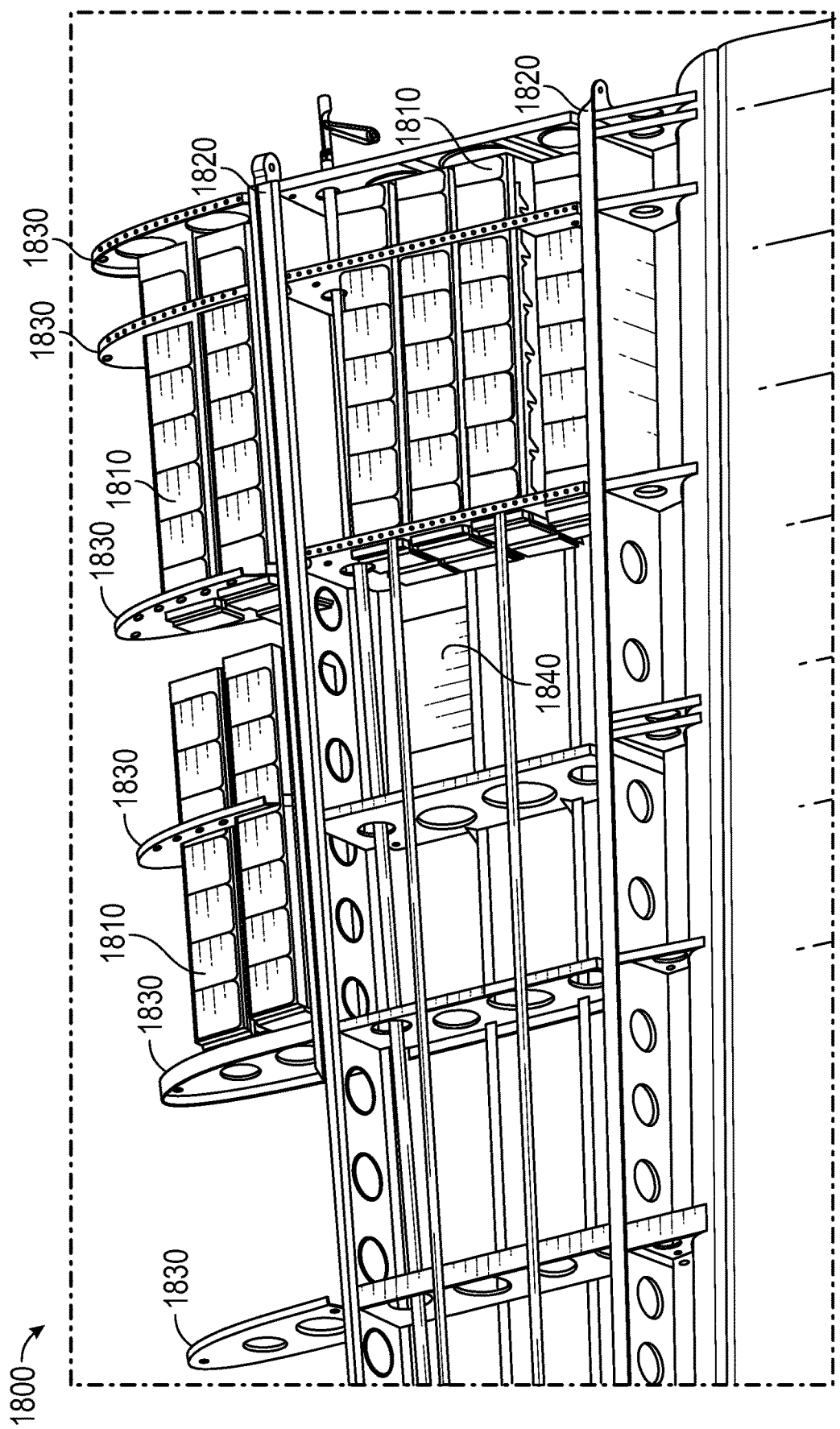
FIGS. 18A and 18B illustrate multiple power sources positioned in a wing of an aircraft for powering the aircraft.

FIG. 18A illustrates a top view of a wing 1800 of an aircraft that includes multiple power sources 1810, such as multiple of the power source 1500A, for powering one or more components of the aircraft. The multiple power sources 1810 can be sized and arranged to optimize a weight distribution and use of space around the wing 1800. For example, the multiple power sources 1810 can be positioned within, between, or around horizontal support beams 1820 or vertical support beams 1830 of the wing 1800. A relay 1840 can further be positioned in the wing 1800 as illustrated and housed in a sealed enclosure. The relay 1840 may open if there is not a threshold voltage on a breaker panel or if a pilot opens breakers to shut down the multiple power sources 1810.

Figure 18B:
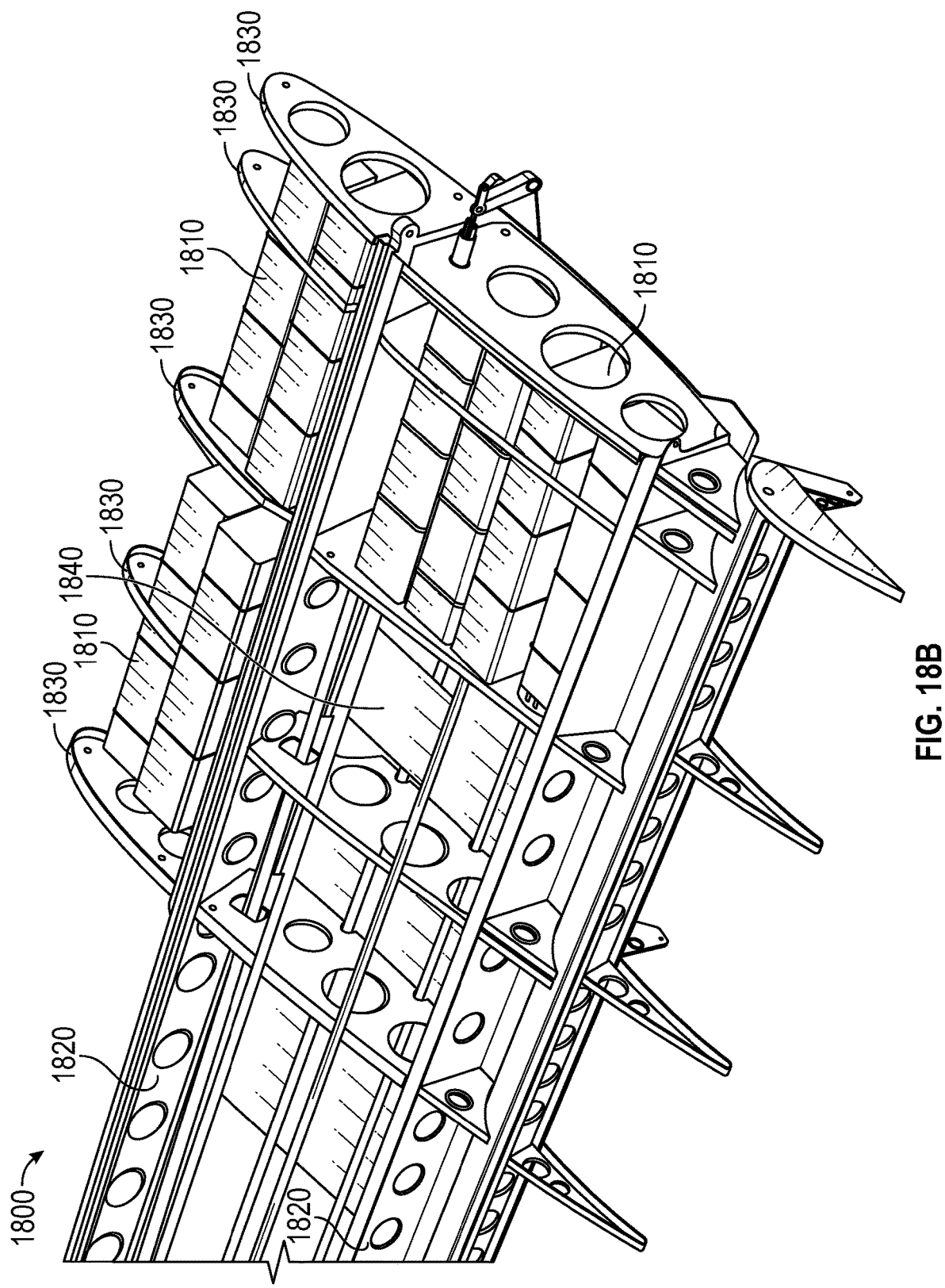

FIG. 18B illustrates a perspective view of the wing 1800 of FIG. 18A.

Multi-Coil Motor Control

An electric or hybrid aircraft can be powered by a multi-coil motor, such as an electric motor, in which different coils of the motor power different phases of a modulation cycle for the motor.

Figure 19:
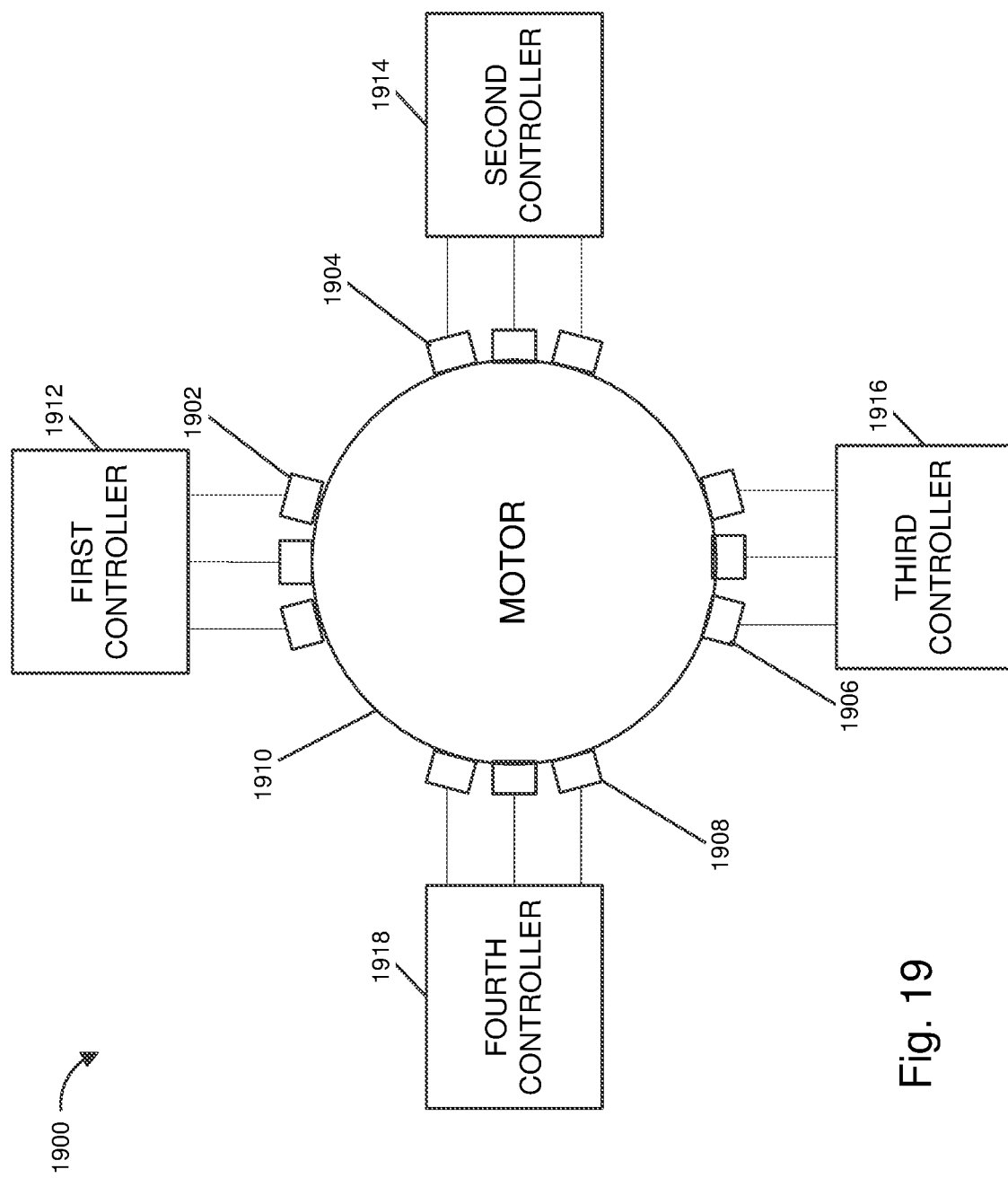
FIG. 19 illustrates a motor with multiple field coils.

As can be seen from FIG. 19, a motor 1910 can include four different field coils (sometimes also referred to as coils) for generating a torque on a rotor of the motor 1910. The different field coils can include a first field coil 1902, a second field coil 1904, a third field coil 1906, and a fourth field coil 1908. Each of the different field coils can be independently powered by one or more controllers. The first field coil 1902, the second field coil 1904, the third field coil 1906, and the fourth field coil 1908 can be respectively powered by a first controller 1912, a second controller 1914, a third controller 1916, and a fourth controller 1918. One or more of the first controller 1912, the second controller 1914, the third controller 1916, and the fourth controller 1918 may be the same controller.

The first controller 1912, the second controller 1914, the third controller 1916, and the fourth controller 1918 can vary a current provided to individual coils of the first field coil 1902, the second field coil 1904, the third field coil 1906, and the fourth field coil 1908 to compensate for a failure of one or more (such as, one, two, or three) of the field coils. The first controller 1912, the second controller 1914, the third controller 1916, and the fourth controller 1918 may, for example, no longer provide current to a coil that has failed and provide additional current to one or more coils that have not yet failed. The first controller 1912, the second controller 1914, the third controller 1916, and the fourth controller 1918 can attempt to maintain a power output of the motor (for example, above a threshold) despite the failure of the one or more of the field coils.

The first controller 1912, the second controller 1914, the third controller 1916, or the fourth controller 1918 can determine the failure of one or more of the field coils from one or more sensors monitoring the motor or one or more individual field coils, such as proximate to the motor or one or more individual field coils. The one or more sensors can include a temperature sensor, a current sensor, or a magnetic field sensor, among other types of sensors. For example, where the one or more sensors includes at least one temperature sensor, the first controller 1912, the second controller 1914, the third controller 1916, or the fourth controller 1918 can determine the failure of one or more of the field coils from a change in the temperature sensed by the temperature sensor (for instance, a temperature drop over time or proximate different field coils may correspond to a failure of a particular field coil or a number of field coils in the motor 1910). The first controller 1912, the second controller 1914, the third controller 1916, or the fourth controller 1918 may moreover attempt to operate the motor so that the temperature sensed remains constant within a tolerance. As another example, where the one or more sensors includes at least one voltage sensor, the first controller 1912, the second controller 1914, the third controller 1916, or the fourth controller 1918 can determine the failure of one or more of the field coils from a change in the voltage sensed by the voltage sensor (for instance, a voltage spike may correspond to a failure of a particular field coil or a number of field coils in the motor 1910). As yet another example, where the one or more sensors includes at least one magnetic field sensor, the first controller 1912, the second controller 1914, the third controller 1916, or the fourth controller 1918 can determine the failure of one or more of the field coils from a change in the resonance sensed by the magnetic field sensor.

Figure 20:
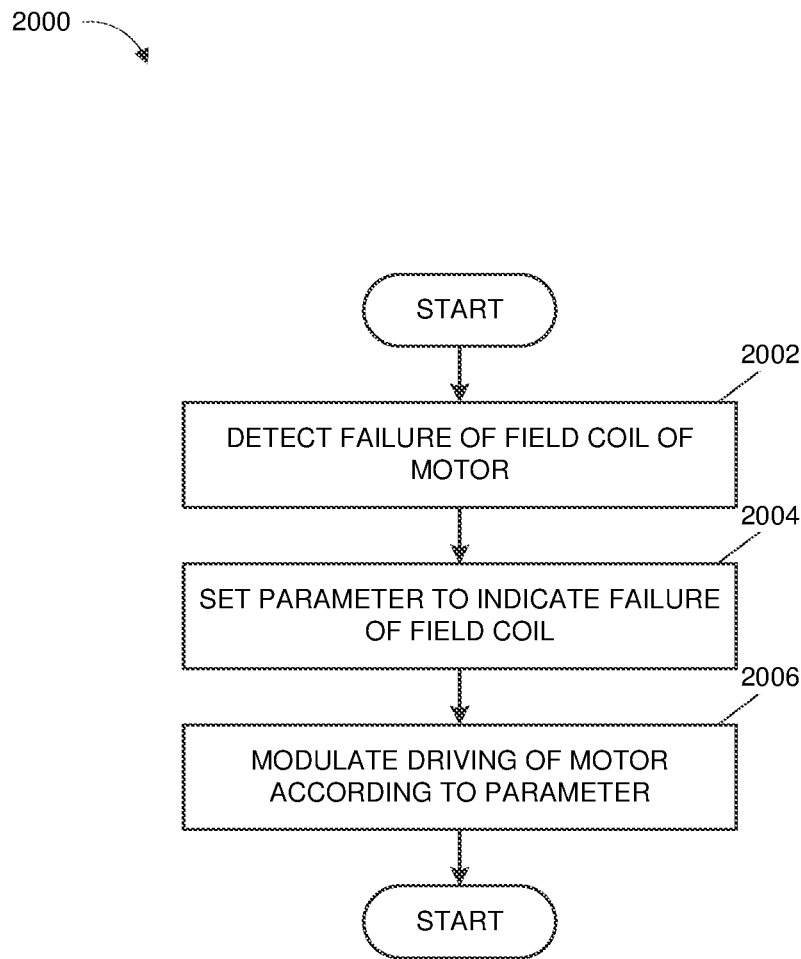
FIG. 20 illustrates a process for operating a motor to compensate for failure of a field coil of the motor.

FIG. 20 illustrates a process 2000 for operating a motor, such as the motor 1900, to compensate for the failure of a field coil of the motor. For convenience, the process 2000 is described as being performed by the first controller 1912, the second controller 1914, the third controller 1916, or the fourth controller 1918 of FIG. 19. However, the process 2000 may additionally or alternatively be performed by another processor or electronic circuitry, such as is described herein. The process 2000 can advantageously enable a quick reaction (for instance, within a few seconds or even faster) to failure of one or more failed field coils so that the operation of the motor may be quickly adjusted to maintain a power output of the motor despite the failure of the one or more field coils.

At block 2002, a failure of a field coil of a motor can be detected. For example, the first controller 1912, the second controller 1914, the third controller 1916, or the fourth controller 1918 can detect failure of one or more of the first field coil 1902, the second field coil 1904, the third field coil 1906, or the fourth field coil 1908 from a change in electrical coil characteristics, a change in how the field coil may be driven, a feedback from the motor 1900 about its operations, a change in performance of the motor 1900, or an output from a sensor.

At block 2004, a parameter can be set to indicate the failure of the field coil. For instance, the first controller 1912, the second controller 1914, the third controller 1916, or the fourth controller 1918 can set a parameter in a memory device indicative of the failure of the field coil.

At block 2006, a driving of the motor can be modulated according to the parameter. For example, the first controller 1912, the second controller 1914, the third controller 1916, or the fourth controller 1918 can adjust how the field coil that has failed is driven based on a stored indication that the field coil has failed. The first controller 1912, the second controller 1914, the third controller 1916, or the fourth controller 1918 may modulate a power input to the motor over time to compensate for the failure of the field coil and, during a modulation cycle for the motor, to increase the power input to one or more functioning field coils to compensate for the failure.

The first controller 1912, the second controller 1914, the third controller 1916, or the fourth controller 1918 can, prior to a failure of a field coil, provide the electrical current one time to all of the first field coil 1902, the second field coil 1904, the third field coil 1906, and the fourth field coil 1908 in an order prior to providing the electrical current another time to any of the first field coil 1902, the second field coil 1904, the third field coil 1906, and the fourth field coil 1908. Subsequent to the failure of the field coil, the first controller 1912, the second controller 1914, the third controller 1916, or the fourth controller 1918 may no longer provide electrical current to the field coil that has failed and can increase a current provided to one or more other field coils (such as to a field coil before the failed field coil and after the failed field coil in the order) to compensate for the failure of the field coil.

Additionally or alternatively, the electric or hybrid aircraft can vary a rotation rate (for instance, revolutions per minute) of the motor or a pitch of a propeller of the aircraft (for instance, increase the pitch to increase the power output) to compensate for a failure of one or more (such as, one, two, or three) of the field coils, as well as attempt to maintain a power output of the motor despite the failure of the one or more of the field coils.

Moreover, the process 2000 can be adjusted so that the driving of the motor may be modulated responsive to the detection of the failure of the field coil and without the storing or referencing of the parameter.

Example Implementations

A battery monitoring system is disclosed for monitoring and transmitting parameters relating to the state of a battery pack to a driver or pilot of an electric vehicle. The battery monitoring system can include a first battery monitoring circuit and a second redundant battery monitoring circuit. The first battery monitoring circuit can include multiple battery management systems (BMSs). Each BMS can manage and monitor a different subset of battery cells in the battery pack. The first battery monitoring circuit can include a digital communication bus to provide first warning signals to a driver or pilot of the vehicle in case of dysfunction of the battery pack. The second battery monitoring circuit can redundantly monitor the battery pack to provide at least one second warning signal to the driver or pilot of the vehicle in case of dysfunction of the battery pack. The second battery monitoring circuit may include only analog or combinational logic electronic components.

The battery monitoring system of the preceding paragraph can include one or more of the following features: The second battery monitoring circuit can be a processorless circuit. The second battery monitoring circuit may include only analog or combinational logic electronic components. The second battery monitoring circuit may transmit only analog or binary signals. The second battery monitoring circuit can transmit signals for the driver or pilot via communications lines different from the digital communication bus. The second battery monitoring circuit may not manage the charge and discharge of battery cells. The first battery monitoring circuit can include first electronic measurement components and the second battery monitoring circuit can include second, distinct electronic measurement components. The first electronic measurement components can measure the temperature of battery cells, and the second electronic measurement components can measure the temperature of the same battery cells. The first electronic measurement components can detect an undervoltage or overvoltage condition of battery cells, and second electronic measurement components can detect an undervoltage or overvoltage condition of the same battery cells. The first battery monitoring circuit and the second battery monitoring circuit can share a common set of electronic measurement components for measuring the state of the battery cells. The second battery monitoring circuit can include: multiple identical BMS, each BMS controlling and monitoring one battery cell in the battery pack; and multiple master circuits, each master circuit controlling multiple BMS and collecting parameters monitored by the multiple BMS circuits. Each master circuit can include a CAN bus driver circuit. The second battery monitoring circuit can include multiple parameter sensors, each sensor generating one or a plurality of digital binary parameters depending on the state of one battery cell. The battery monitoring system can further include multiple combinational logic components for combining multiple binary parameters related to one battery cell. The battery monitoring system can further include multiple combinational logic components for combining multiple binary parameters related to multiple battery cells and generating the at least one second warning signal if one of the battery cells is defect. The battery monitoring system can further include multiple printed circuit board (PCB) cards, and one master circuit and one combinational logic component can be mounted on each of the PCB cards. The second battery monitoring circuit can be built so that any defective electronic measurement component triggers a second warning signal.

An electrical powering system is disclosed that can be used in an electric aircraft for powering a driving thrust-generating propeller or a lift-generating rotor. The electrical powering system can include: at least one motor; a first battery pack including high energy-density, low power battery cells; a second battery pack including low energy-density, high power battery cells; a circuit including a controller for powering said at least one motor from at least one of said battery packs and for generating motor driving signals for driving said at least one motor; wherein the electrical powering system is configured to charge said second battery pack from said first battery pack.

The electrical powering system of the preceding paragraph can include one or more of the following features: The can charge said second battery pack from said first battery pack. The controller or the circuit can transmit power from the first battery pack to the at least one motor at first instants and to the second battery pack and optionally to the motor at second instants. The controller or the circuit can include a selector for selecting a powering of the at least one motor: from the first battery pack only; from the second battery pack only; or simultaneously from the first and from the second battery pack. The circuit can include a DC-DC converter for converting current from the first battery-pack into current for charging the second battery pack. The electrical powering system can further include: a first said motor and a second said motor; a first controller circuit for generating motor driving signals for driving the first said motor; a second controller circuit for generating motor driving signals for driving the second said motor. The electrical powering system can further include a switching module connected to said first battery pack, to said second battery pack, to said first controller, and to said second controller, for commuting current from the first battery pack either, at different instants, to the second battery pack, to the first controller, or to the second controller. The switching module can commute current from the second battery pack either at different instants to the first controller or to the second controller. At least one of said motors acting as a generator for charging one of said battery packs. The electrical powering system can further include a commutator for determining which of said first battery pack and said second battery pack is charged by said generator. Said first battery pack and said second battery pack can include Li-Ion or Li—Po battery cells. The electrical powering system can further include a supercapacitor for powering said at least one motor, wherein said circuit is able to power said at least one motor from at least one of said first battery pack and said second battery pack or from said supercapacitor, and to charge said second battery pack from said first battery pack or from said supercapacitor. At least one of said at least one motor is able to work as a generator, said circuit being arranged for charging one of said first battery pack and said second battery pack from said generator when said generator is generating current. The electrical powering system can further include one motor arranged to work at least during some instants as a motor powered by one battery pack and as a generator for charging another battery pack or supercapacitor. The electrical powering system can further two said motors on a single axis so that at least during some instants one of the motors is functioning as a motor powered from one battery pack while the other motor is functioning as a generator for charging another battery pack. Aircraft can include the electrical powering system.

An electrical powering system is disclosed that can be used in an electric aircraft for powering a driving thrust-generating propeller or a lift-generating rotor. The electrical powering system can include: at least one motor; a first battery pack including high energy-density, low power battery cells; a second battery pack including low energy-density, high power battery cells; and a circuit comprising a controller for powering said at least one motor from at least one of said battery packs and for generating motor driving signals for driving said at least one motor. The electrical power system is configured to charge said first battery pack or said second battery pack from at least one of the at least one motor operating as generator.

The electrical powering system of the preceding paragraph can include one or more of the following features: The electrical powering system can charge said second battery pack from at least one of the at least one motor operating as generator. The controller can include: a first controller for powering said at least one motor from the first battery pack and for generating motor driving signals for driving said at least one motor; and a second controller for charging the second battery pack from the generator signals generated by the one motor operating as generator. The second controller can power said at least one motor from the second battery pack and for generating motor driving signals for driving said at least one motor. The at least one motor can include an electrical motor with a rotor, a first set of windings connected to the first controller for driving the rotor of the electrical motor based on the signals from the first controller, and a second set of windings connected to the second controller for generating generator signals from the rotor of the electrical motor to charge the second battery pack. The at least one motor can include a first motor connected to the first controller for driving the first motor based on the signals from the first controller and a second motor connected to the second controller for generating generator signals from the second motor of the electrical motor to charge the second battery pack. The first motor and the second motor can be mechanically coupled. The electrical powering system can concurrently drive the at least one motor based on the first battery pack and charge the second battery pack from the motor operated as generator. The electrical powering system can further include a supercapacitor, and the electrical powering system can charge the supercapacitor from the motor operated as generator. The circuit can drive the at least one motor in different drive modes, and the different drive modes can include a first drive mode in which the at least one motor is driven from the energy of the first battery pack. The different drive modes can include at least one of the following: a drive mode in which the at least one motor is driven from the power of the first battery pack and of the second battery pack, a drive mode in which the at least one motor is driven from the power of the second battery pack, a drive mode in which the at least one motor is driven from the power of the first battery pack and in which the second battery pack is charged by the power generated from the motor operated as generator, a drive mode in which the at least one motor is driven from the power of the first battery pack and in which the second battery pack is charged by the power generated from the motor operated as generator, a drive mode in which the first battery pack is charged by the power generated from the motor operated as generator, a drive mode in which the second battery pack is charged by the power generated from the motor operated as generator, a drive mode in which the first battery pack and the second battery pack is charged by the power generated from the motor operated as generator. The electrical powering system can further include a supercapacitor, and the different drive modes can include at least one of the following: a drive mode in which the at least one motor is driven from the power of the supercapacitor, a drive mode in which the at least one motor is driven from the power of the supercapacitor and of the first or second battery pack, a drive mode in which the at least one motor is driven from the power of the first battery pack or second battery pack and in which the super capacitor is charged by the power generated from the motor operated as generator, a drive mode in which the supercapacitor is charged by the power generated from the motor operated as generator, a drive mode in which the supercapacitor and the first battery pack or the second battery pack is charged by the power generated from the motor operated as generator. The second battery pack can be charged from the power of the first battery pack. An aircraft can include the electrical powering system. The motor operating as generator can be driven by braking energy of the aircraft.

Additional Features and Terminology

Although examples provided herein may be described in the context of an aircraft, such as an electric or hybrid aircraft, one or more features may further apply to other types of vehicles usable to transport passengers or goods. For example, the one or more futures can be used to enhance construction or operation of automobiles, trucks, boats, submarines, spacecrafts, hovercrafts, or the like.

As used herein, the term "programmable component," in addition to having its ordinary meaning, can refer to a component that may process executable instructions to perform operations or may be configured after manufacturing to perform different operations responsive to processing the same inputs to the component. As used herein, the term "non-programmable component," in addition to having its ordinary meaning, can refer to a component that may not process executable instructions to perform operations and may not be configured after manufacturing to perform different operations responsive to processing the same inputs to the component.

As used herein, the term "stateful component," in addition to having its ordinary meaning, can refer to a component that may remember a preceding state or event prior to a current state or event. A stateful component thus may determine an output from an event history as opposed to just from a current condition. As used herein, the term "non-stateful component," in addition to having its ordinary meaning, can refer to a component that may not remember a preceding state or event prior to a current state or event. A non-stateful component thus may not determine an output from an event history but may determine an output from a current condition.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for instance, through multi-threaded processing, interrupt processing, or multiple processors or processor cores or on other parallel architectures, rather than sequentially. In addition, different tasks or processes can be performed by different machines or computing systems that can function together.

The various illustrative logical blocks, modules, and algorithm steps described herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, a microprocessor, a state machine, a digital signal processor (DSP), an application specific integrated circuit (ASIC), a FPGA, or other programmable logic device, discrete gate or transistor logic, discrete hardware components, or any combination thereof designed to perform the functions described herein. A hardware processor can include electrical circuitry or digital logic circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a device controller, or a computational engine within an appliance, to name a few.

The steps of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements or states. Thus, such conditional language is not generally intended to imply that features, elements or states are in any way required for one or more embodiments or that one or more embodiments necessarily include logic for deciding, with or without author input or prompting, whether these features, elements or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

What is claimed is:

1. An aircraft monitoring system for an electric or hybrid aircraft, the aircraft monitoring system being constructed to enable the electric or hybrid aircraft to pass certification requirements relating to a safety risk analysis, the aircraft monitoring system having different subsystems for monitoring and alerting of failures of device components of the electric or hybrid aircraft, failures that pose a greater safety risk being monitored and indicated by one or more subsystems without use of programmable components, the aircraft monitoring system comprising:

a first subsystem configured to be supported by a housing and consisting of non-programmable components, the housing being configured to fly and be propelled by an electric motor, wherein the non-programmable components are configured to:

monitor a device component that is supported by the housing and facilitates operation of the electric motor, and output a first alert to notify of a first condition associated with the device component, the first condition being within a category of conditions which may imminently cause a fatality or a destruction of the housing; and a second subsystem configured to be supported by the housing and comprising a programmable component and a communication bus, wherein the programmable component is configured to:

monitor the device component from communications on the communication bus, and output a second alert to notify of a second condition associated with the device component.

2. The aircraft monitoring system of claim 1, wherein the device component comprises a motor controller configured to operate the electric motor.

3. The aircraft monitoring system of claim 1, wherein the non-programmable components consist of analog or combinational logic electronic components.

4. The aircraft monitoring system of claim 1, wherein the non-programmable components consist of non-stateful components.

5. The aircraft monitoring system of claim 1, wherein the non-programmable components are configured to:
activate an indicator supported by the housing to output the first alert, and
inactivate the indicator unless the indicator is outputting the first alert.

6. The aircraft monitoring system of claim 5, wherein the indicator comprises a light.

7. The aircraft monitoring system of claim 5, wherein the indicator comprises an audible alarm.

8. The aircraft monitoring system of claim 1, wherein the first subsystem is not configured to communicate via the communication bus.

9. The aircraft monitoring system of claim 1, wherein:
the non-programmable components are configured to monitor the device component using a first output from a first sensor; and
the programmable component is configured to monitor the device component using a second output from a second sensor different from the first sensor.

10. The aircraft monitoring system of claim 1, wherein the non-programmable components are configured to output the first alert to the programmable component or another programmable component supported by the housing, and the programmable component or the another programmable component are configured to activate an electronic device supported by the housing to attempt to address the first condition.

11. The aircraft monitoring system of claim 1, wherein the non-programmable components are configured to output the first alert to an electronic device remote from the housing.

12. The aircraft monitoring system of claim 1, wherein the non-programmable components and the programmable component are configured to monitor the device component using a common output from a sensor.

13. The aircraft monitoring system of claim 1, wherein the first condition is a failure or an overheating of the device component.

14. The aircraft monitoring system of claim 1, wherein the first condition is the device component being on fire.

15. The aircraft monitoring system of claim 1, wherein the first alert indicates that a crash of the housing is imminent.

16. The aircraft monitoring system of claim 1, wherein the second condition is within a category of conditions which may not imminently cause the fatality or the destruction of the housing.

17. The aircraft monitoring system of claim 1, wherein the programmable component comprises a processor.

18. The aircraft monitoring system of claim 1, further comprising a display configured to present the second alert.

19. A method of operating an aircraft monitoring system of an electric or hybrid aircraft, the aircraft monitoring system being constructed to enable the electric or hybrid aircraft to pass certification requirements relating to a safety risk analysis, the method comprising:
supporting a first subsystem, a second subsystem, a device component, and an electric motor with a housing that is configured to fly,
wherein the first subsystem consists of non-programmable components, and the second subsystem comprises a programmable component and a communication bus;
facilitating, by the device component, operation of the electric motor;
propelling, by the electric motor, the housing;
monitoring, by the non-programmable components, the device component;
outputting, by the non-programmable components, a first alert to notify of a first condition associated with the device component, the first condition being likely to imminently cause a fatality or a destruction of the housing;
monitoring, by the programmable component, the device component from communications on the communication bus; and
outputting, by the programmable component, a second alert to notify of a second condition associated with the device component.

20. The method of claim 19, wherein the device component comprises a motor controller, and said facilitating comprises operating the electric motor.

21. The method of claim 19, further comprising:
activating an indicator supported by the housing to output the first alert;
inactivating the indicator when the non-programmable components are not outputting the first alert; and
presenting the second alert on a display supported by the housing.

22. The method of claim 19, further comprising, responsive to the first alert, activating an electronic device supported by the housing to attempt to address the first condition.

* * * * *